United States Patent [19]

Moeckel

[11] Patent Number: 4,894,809
[45] Date of Patent: Jan. 16, 1990

[54] METHOD FOR BIN, MOVEOUT CORRECTION AND STACK OF OFFSET VERTICAL SEISMIC PROFILE DATA IN MEDIA WITH DIP

[75] Inventor: George P. Moeckel, Duncanville, Tex.

[73] Assignee: Mobil Oil Corporation, New York, N.Y.

[21] Appl. No.: 205,767

[22] Filed: Jun. 13, 1988

Related U.S. Application Data

[63] Continuation-in-part of Ser. No. 737,352, May 23, 1985, Pat. No. 4,802,146, and a continuation-in-part of Ser. No. 737,356, May 23, 1985, Pat. No. 4,802,147.

[51] Int. Cl.$^4$ .............................................. G01V 1/36
[52] U.S. Cl. .................................... 367/57; 367/51; 367/53
[58] Field of Search ................. 367/50, 51, 52, 53, 367/54, 57, 61; 364/421, 422

[56] References Cited

U.S. PATENT DOCUMENTS

| | | | |
|---|---|---|---|
| 3,886,487 | 5/1975 | Walsh et al. | 340/3 R |
| 4,314,347 | 2/1982 | Stokely | 364/574 |
| 4,372,239 | 2/1983 | Hagelberg et al. | 114/20 |
| 4,397,004 | 8/1983 | Bronislaw | 367/27 |
| 4,596,005 | 6/1986 | Frasier | 367/38 |
| 4,597,066 | 6/1986 | Frasier | 367/38 |
| 4,597,464 | 7/1986 | Chelminski | 181/114 |
| 4,627,036 | 12/1986 | Wyatt | 367/57 |
| 4,628,492 | 12/1986 | Winney | 367/63 |
| 4,802,146 | 1/1989 | Moeckel | 367/52 |
| 4,802,147 | 1/1989 | Moeckel | 367/57 |

OTHER PUBLICATIONS

Moeckel, George P.; "Moveout Correction, Bin and Stack of Offset VSP Reflection Data"; Presentation at the Annual Mtg. of the Soc. of Exp. Geo., Oct. 1986.

*Primary Examiner*—Thomas H. Tarcza
*Assistant Examiner*—Ian J. Lobo
*Attorney, Agent, or Firm*—Alexander J. McKillop; Charles J. Speciale; George W. Hager, Jr.

[57] ABSTRACT

Seismic energy is generated at a multiplicity of source offsets from a borehole and offset VSP data is collected by an acoustic detector at a multiplicity of geophone depths for each source offset. The recorded data is sorted into Zero Source-Receiver (ZSR), common reflection point bins. Data from each offset VSP, ZSR common reflection point gather are dynamically moveout corrected with data adaptive parameters including reduced direct arrival times, dip, borehole deviation and stacking velocities. The moveout corrected VSP data are then stacked.

10 Claims, 14 Drawing Sheets

SOURCE OFFSET: 3000'   RECEIVER SPACING: 50'

SOURCE OFFSET: 3000' RECEIVER SPACING: 50'

METHOD FOR BIN, MOVEOUT CORRECTION AND STACK OF OFFSET VERTICAL SEISMIC PROFILE DATA IN MEDIA WITH DIP

RELATED APPLICATIONS

This application is a continuation-in-part of U.S. patent application Ser. No. 737,352, filed May 23, 1985 now U.S. Pat. No. 4,802,146.

This application is also a continuation-in-part of U.S. patent application Ser. No. 737,356, filed May 23, 1985 now U.S. Pat. No. 4,802,147.

BACKGROUND OF THE INVENTION

1. Field of the Invention

This invention is related to the processing of offset vertical seismic profile (VSP) data. More specifically, this invention is related to the processing of gathered offset VSP data by sorting the offset VSP data into Zero Source Receiver (ZSR) common reflection point bins, correcting the sorted data for moveout and stacking the corrected data.

2. Description of the Prior Art

Vertical Seismic Profiling is a method for investigating underground formations by placing an acoustic wave detector in a well bored into the earth, placing a source of seismic energy such as an acoustic wave generator at a given distance from the well head, activating the source to generate acoustic waves into the underground formation under investigation and recording the resultant seismic signals produced by the acoustic detector. The acoustic wave detector is then moved to a series of different well depths, seismic energy is generated by the source for each placement of the acoustic detector at an additional borehole depth and the resultant seismic signals produced by the detector for each respective borehole depth are recorded. The detected signals recorded at the various depths are then grouped together in a single display for analysis. See, for example, U.S. Pat. No. 4,397,004 issued to Bronislaw Seeman for a description of Vertical Seismic Processing.

Borehole seismic acquisition methods are often designed to obtain data at multiple long offsets for a number of reasons. Some of the applications which require Vertical Seismic Profile data at multiple long offsets include: (a) providing offset seismic profiles recorded in a well that are directly correlative to well log data; (b) acquiring seismic data free of surface noise; (c) determining seismic transmission and reflection properties related to offset and depth; (d) acquiring data for tomography/inversion and imaging; (e) delineating reservoir properties when offset VSP profiles are conducted in a field for several wells with two-dimensional or three-dimensional applications; and (f) determining depth and inter-reflector velocities of reflectors below the borehole Total Depth (TD) from lookahead VSP data.

In many cases, Vertical Seismic Profiles must be conducted with the source placed at a considerable distance from the well. The reasons for the placement of the seismic source distant from the well are typically practical ones. For example, source-induced noise such as casing ring and tube waves can obscure reflection events when the source is close to the well. The configuration of the drilling support equipment on a well pad may also necessitate placement of the source at some distance from the well. Occasionally, culture or local land conditions dictate the placement of the source at a considerable distance from the well. Of these, the most frequent demand for long offset Vertical Seismic Profile data acquisition is the requirement for tube wave suppression. It has been found that the amplitude of tube waves diminishes with increasing source offset from a well. Also, the time delay of seismic reflection events resulting from a long offset source are usually less than the delay of tube wave inception. This tends to keep reflection events well separated from tube waves, resulting in much higher quality for data acquired during a VSP survey.

Offset VSP has not been as extensively developed as surface seismic processing of conventional VSP processing. Conventional VSP data processing assumes that the source offset from the well is essentially zero. Common Depth Point (CDP) stacking, a popular reflection seismology processing technique, utilizes the near-hyperbolicity of primary seismic reflection arrivals to align redundant reflections obtained from multiple shot/receiver experiments conducted on the earth surface. CDP stacking, however, has not produced similar results when used in conjunction with offset VSP data. The asymmetry of the shot and receiver locations used in offset VSP explorations precludes the possibility of CDP stacking to align offset VSP traces as exactly as CDP stacked traces of other types of seismic data.

SUMMARY OF THE INVENTION

It is an object of this invention to provide a method of offset VSP processing applicable to media with dip. It is another object of this invention to provide a method of offset VSP processing applicable to media with dip which aligns VSP reflections by moveout correction. Yet another object of this invention to provide a method of offset VSP processing applicable for media with dip which provides surface ZSR/CDP seismic sections for offset VSP data.

Seismic energy is generated at a multiplicity of source offsets from a borehole and offset VSP data is collected by an acoustic detector at a multiplicity of geophone depths for each source offset. The recorded data is sorted into Zero Source-Receiver (ZSR), common reflection point bins. Data from each offset VSP, ZSR common reflection point gather are dynamically moveout corrected with data adaptive parameters including reduced direct arrival times, dip and stacking velocities. The moveout corrected VSP data are then stacked.

The above and other objects, advantages and features of the invention will be more readily understood from the following detailed description of the invention, which is provided in connection with the accompanying drawings.

DEFINITION OF TERMS

The following symbols and their definitions are to be used in conjunction with this application.

| SYMBOL | DEFINITION |
| --- | --- |
| $D(x_s, z_G, T)$ | upcoming, primary reflected date in a VSP |
| T | primary reflector transit time (transit time for a seismic wave to propagate from the source located the surface at $x_s$ and to arrive at a geophone at depth $z_G$) as an upcoming wavefield after reflection); |
| $T_{ss}$ | reflection time for surface-to-surface ray path; |
| $T_o$ | normal incidence one-way reflection time from the surface to a reflector; |
| $t_\infty$ or $t'_o$ | two-way normal incidence reflection time from the surface to the reflector at depth $z_0$; |
| $T_B(z_R)$ | zero offset, normal incidence, first break time; |
| $T_{HB}$ | time for a wave to propagate from the geophone at depth $z_G$ to the surface along a path normal to the reflector; |
| $T_{HG}$ | time required for a wave to propagate from the source to a hypothetical reflector passing through the geophone with dip (+ theta) along a path normal to the reflector; |
| $T_{HS}$ | time required for a wave to propagate from the source to the reflector along a path normal to the reflector; |
| V | ray velocity; |
| $v_0$ | the constant velocity describing the media; |
| $v_{STk}$ | stacking velocity; |
| x | horizontal coordinate of VSP reflection loci; |
| $x_p$ | location of surface emergence of extension of offset VSP reflection event raypath; |
| $x_s$ | source-wellhead offset distance on the surface; |
| $z_R$ or $z_G$ | the depth of the geophone in a borehole; |
| $z_{Rk}$ | the deepest geophone location for which a first break time is obtained; |
| $z_0$ | reflector depth; |
| $\beta$ | angle source location to geophone location; |
| $\Delta$ | bin width; |
| $\lambda$ | $90 - (\beta + \theta)$; and |
| $\theta$ | angle of formation dip. |

DESCRIPTION OF THE PREFERRED EMBODIMENT

Offset VSP data is acquired in wells to assist the determination of structural and stratigraphic details in the vicinity of the borehole. The collection of such data is advantageous because it provides a seismic expression of subsurface features which are correlative to well log data. A well-designed offset VSP survey is capable of detecting faults, structure, and seismic facies changes near the well bore.

Figure 1:
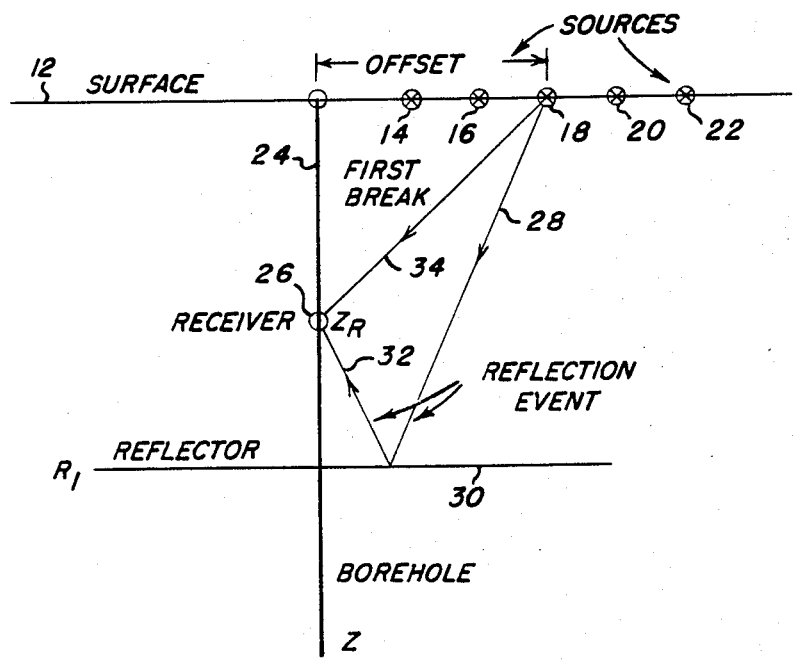
FIG. 1 illustrates a plan view of a system for obtaining vertical seismic profile (VSP) data.

Referring first to FIG. 1, a plan view of a data acquisition source for acquiring vertical seismic profile data is shown. Illustrated along the earth's surface 12 are acoustic pulse sources 14, 16, 18 and 20, each having a distance x associated with it. The distance x is the distance measured from a borehole 24 in which an acoustic pulse receiver 26 is suspended. A travel path 28 is illustrated as the path of an acoustic pulse from acoustic source 18 that has been reflected off reflector 30 and received by geophone or receiver 26. Raypath 32 is the path of an acoustic pulse generated by source 18 and traveling directly to receiver 26, normally called the "first break" path. The general field setup for an offset VSP is depicted in FIG. 1 with the shots placed on the earth's surface by sources 14, 16, 18, 20 and 22 and received by geophone or receiver 26 downhole.

In the execution of a standard vertical seismic profile, the seismic source and receiver are regarded to be nearly on the same vertical line. Primary seismic reflections obtained from a receiver located at various depths may be aligned or flattened by adding the one-way first break time $T_B(z_R)$ to the seismic record obtained with the receiver at depth $z_R$. Usually, VSP data are preprocessed to remove downgoing waves before reflection alignment is achieved.

When the source and receiver are not on the same vertical line and the VSP is executed with long offsets, a different procedure for aligning primary reflections will be required. According to Appendix I, for flat layers ($\theta = 0°$), the primary reflection travel time T is given by $$T^2(x, z_R) = \frac{x^2}{v_0^2} + \frac{z_R^2}{v_0^2} + t_\infty^2 - 2t_\infty \frac{z_R}{v_0}, \quad (1)$$

where x is the offset distance of the source from the borehole, $z_R$ is the depth of the receiver in the borehole, and $v_0$ is the constant velocity describing the media. The time $t_\infty$ is $$t_\infty = \frac{2z_0}{v_0}, \quad (2)$$

which is the two-way, normal incidence travel time to a reflector at depth $z_0$ from the surface $z=0$. At offset $x=0$, $$T^2(x = 0, z_R) = t_\infty^2 - 2t_\infty \frac{z_R}{v_0} + \frac{z_R^2}{v_0^2} = \left(t_\infty - \frac{z_R}{v_0}\right)^2. \quad (3)$$

At offset $x=0$ and depth $z_R=0$, $$T^2(x = 0, z_R = 0) = t_\infty^2. \quad (4)$$

It follows that $$T^2(x, z_R) = T_0^2(z_R) + \frac{x^2}{v_0^2}. \quad (5)$$

This last formula is reminiscent of the hyperbolic stacking formula used in NMO corrections for CDP gathered data. Formula (5) cannot be adapted to variable velocity media. In order to indicate why this cannot be done, the following interpretations are assumed. The first break time $T_B(z_R)$ corresponds to $z_R/v_O$, that is, replace $z_R/v_O$ in formula (5) by $T_B(z_R)$.

$$\frac{z_R}{v_0} - T_B(z_R) = \int_0^{z_R} \frac{d\zeta}{v(\zeta)}. \tag{6}$$

The first break times $T_B(z_R)$ for normal incidence are already computed from VSP data in a separate algorithm which may be any currently in use in the art. Such an algorithm attempts to correct for the slant path of the direct arrival rays when the source is offset some distance x. If the velocity $v_O$ appearing in formula (5) is interpreted as the stacking velocity, formula (5) may be rewritten as $$t_\infty = T_B(z_R) + \sqrt{T^2(x,z_R) - \frac{x^2}{v^2(t_\infty)_{stack}}}. \tag{7}$$

This last formula is the type of moveout correction we seek for offset VSP data because it allows the determination of velocity spectra ($t_\infty$ and $v_{stacks}(t_\infty)$) which best flatten reflection data. Since formula (7) is based on formula (5), it cannot be used for VSP moveout correction. For a VSP conducted at a single long offset, redundancy of reflection events must come from variation in depth $z_R$ and not offset x. Thus, to use an offset VSP moveout correction like formula (7), we can consider the offset x as fixed and vary the receiver depth $z_R$. The desire is to modify a standard coherency stack for VIP process to suit our needs. Time windows $$T_B(z_{R1}) < \frac{t_\infty}{2} < T_B(z_{R2})$$

such that $z_{R1} < z_{R2}$ can be selected and optimal parameters $t_\infty$, $v_{stack}(t_\infty)$ determined for moveout correction in that time window. For laterally homogeneous media, where velocity varies with depth only, $v_{stack}(t_\infty)$, appearing in formula (7), is difficult to interpret because of the asymmetry of ray paths. Unless the receiver is on the surface, a downgoing ray path encounters a different set of velocities than the upgoing ray path. An offset VSP moveout formula is disclosed by the present invention in which the velocities are completely interpretable. This formula applies to laterally homogeneous media.

Formula (1) may be interpreted in several different ways. If one assumes that $$\frac{x^2 + z_R^2}{v_0^2} \sim T_B^2(x,z_R), \quad \text{then the first break time at offset } x \text{ and the depth } z_R \text{ is obtained directly from the VSP.} \tag{8}$$

The remaining coefficient, $z_R/v_O$ in formula (1), is interpreted exactly as in equation (6). With these estimates, formula (1) becomes $$T^2(x,z_R) = T_B^2(x,z_R) + t_\infty^2 - 2t_\infty T_B(z_R). \tag{9}$$

If one solves for $t_\infty$, the following moveout formula is obtained:

$$t_\infty = T_B(z_R) + \sqrt{T_B^2(z_R) + T^2(x,z_R) - T_B^2(x,z_R)}. \tag{10}$$

This gives $t_\infty$ directly and no spectra are available. If x=0 (zero offset), $$T_B(x,z_R)\Big|_{x=0} = T_B(z_R) \text{ so that } t_\infty = T_B(z_R) + T(0,z_R).$$

This last result shows that for zero offset, formula (10) reduces to the conventional method of aligning reflection events from VSP traces obtained for multiple depths $z_R$.

Another estimate is possible; we can approve of assumption (8) but not (6), then with a variable velocity $v_s(t_\infty)$, we obtain from formula (1) intersection of a continuation of ray path 32 and surface 12 to source 18 is labeled as X.

Figure 2:
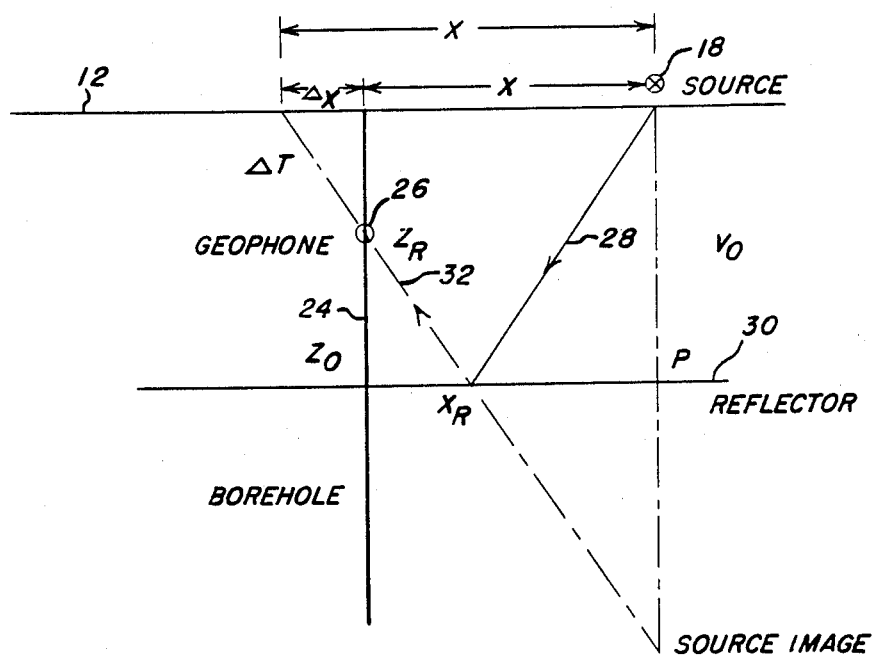
FIG. 2 is a more detailed drawing of FIG. 1.

The offset VSP stacking velocities introduced in formulae (7) and (11) are difficult to interpret. For surface seismic data, in layered media, the stacking velocity for a CDP gather, to a second-order approximation in offset, is the RMS velocity. In FIG. 2, the VSP ray path in media with constant velocity $v_0$ is shown to be extended to surface 12. Since triangles $xx_Rp$ and $z_Rz_0x_R$ are similar triangles, the ratio $$\frac{x - x_R}{z_0} = \frac{x_R}{z_0 - z_R} \tag{14}$$

is valid. Equation (14) may be solved for $x_R$, the reflection point, in terms of the source 18 offset x, reflector 30 has a depth $z_O$, and the receiver depth $z_R$; this results in the expression $$x_R = \frac{(1-h)x}{(2-h)}, \text{ where } h \equiv \frac{z_R}{z_0}. \tag{15}$$

In FIG. 2, $x_R$ is the reflection point and $\Delta T$ is the incremental time for the VSP ray, received at $z_R$, to arrive at the surface a distance $\Delta x$ from the well. From FIG. 2, it is also apparent that $$\frac{z_R}{\Delta x} = \frac{z_0 - z_R}{x_R}, \text{ so that} \tag{16}$$

$$\Delta x = \frac{z_R}{z_0 - z_R} \cdot x_R = \frac{h}{1-h} \cdot x_R.$$

Substitution of equation (15) into equation (16) provides the result $$\Delta x = \frac{h}{2-h} \cdot x. \tag{17}$$

According to FIG. 2, the distance between the point where extended VSP ray 32 meets surface 12 and source 18 is X and $X = x + \Delta x$. An application of equation (17) to this last result allows the relationship $$X = \frac{2x}{2-h}. \tag{18}$$

Let the reflection time for the surface-to-surface ray path be $T_{ss}$, then $$T_{ss}^2 = \frac{4z_0^2}{v_0^2} + \frac{X^2}{v_0^2} = t_\infty^2 + \frac{X^2}{v_0^2}, \text{ or}$$

$$T_{ss} = \sqrt{t_\infty^2 + \frac{X^2}{v_0^2}}.$$

Moreover, for layered media to a second-order approximation in offset distance $X_2$ $$T_{ss} \approx \sqrt{t_\infty^2 + \frac{X^2}{v_{RMS}^2(t_\infty)}}, \quad (19)$$

where $v_{RMS}(t_\infty)$ is the root mean square (RMS) velocity. We now estimate the quantity h appearing in equation (18) as follows $$h \equiv \frac{z_R}{z_0} = \frac{\frac{z_R}{v_0}}{\frac{z_0}{v_0}} \approx \frac{T_B(z_R)}{1/2\, t_\infty},$$

whence follows from equation (18)

$$X = \frac{t_\infty\, x}{t_\infty - T_B}. \quad (20)$$

Substitution of equation (20) into equation (19) leads to the result $$T_{ss} = t_\infty \sqrt{1 + \frac{x^2}{(t_\infty - T_B)^2\, v_{RMS}^2(t_\infty)}}. \quad (21)$$

The offset VSP travel time T is obtained from the surface-to-surface travel time $T_{ss}$ by subtracting the incremental travel time $\Delta T$ from $T_{ss}$; that is $$T = T_{ss} - \Delta T,$$

where $\Delta T$ is the one-way travel time from the point $(0,z_R)$ to the surface point $(\Delta x, 0)$. The time $\Delta T$ can be expressed through a hyperbolic formula which maintains the same order of approximation as is used in formula (19). This formula is:

$$(\Delta T)^2 \approx T_B^2(z_R) + \frac{\zeta^2}{v_{RMS}^2(T_B)}. \quad (22)$$

We notice that if $\zeta = x$, then $$\Delta T \bigg|_{\zeta = x} = T_B(x, z_R),$$

which are recorded data, namely the first break times at offset $\zeta = x$. The times $T_B(x, z_R)$ may be difficult to obtain at long offsets because head refractions may precede these events. In the case $T_B(x, z_R)$ is observed, the zero offset first break time $T_B$ may be estimated by $$T_B^2(z_R) = T_B^2(x, z_R) - \frac{x^2}{v_{RMS}^2(T_B)} \quad (23)$$

and $$[\Delta T(\Delta x)]^2 \cong T_B^2 + \frac{(\Delta x)^2}{v_{RMS}^2(T_B)} \cong T_B^2 + \quad (24)$$

$$\frac{4\, T_B^2/t_\infty^2}{(2 - 2\, T_B/t_\infty)^2} \cdot \frac{x^2}{v_{RMS}^2(T_B)}$$

$$= T_B^2 + \frac{T_B^2}{(t_\infty - T_B)^2} \cdot \frac{x^2}{v_{RMS}^2(T_B)},$$

where equation (17) and the same estimates used in formula (21) have been introduced into formula (22) with $\zeta = \Delta x$. It follows that $$[\Delta T(\Delta x)]^2 = T_B \sqrt{1 + \frac{x^2}{(t_\infty - T_B)^2\, v_{RMS}^2(T_B)}}. \quad (25)$$

It remains to substitute the results of formulae (21) and (25) into the equation, $T = T_{ss} - \Delta T$, to obtain the offset VSP moveout correction formula $$T_{(x, z_R)} = t_\infty \sqrt{1 + \frac{x^2}{(t_\infty - T_B)^2\, v_{RMS}^2(t_\infty)}} - \quad (26)$$

$$T_B \sqrt{1 + \frac{x^2}{(t_\infty - T_B)^2\, v_{RMS}^2(T_B)}}.$$

This formula can be used to obtain velocity spectra in a way that allows the stacking velocities to be interpretable. The velocities appearing in formula (26) are the familiar RMS velocities that are estimated by means of stacking velocities in surface seismic data processing. The asymmetry in offset VSP source-receiver placement is manifest in the requirement that $v_{RMS}(t_\infty)$ and $v_{RMS}(T_B)$ must both appear in the offset VSP moveout correction formula. In formula (26), $t_\infty > T_B$ and for the special case that there is a reflector at depth $z_R$, the equality $t_\infty(z_R) = 2T_B(z_R)$ holds. Once optimal values of $v_{RMS}(t_\infty)$ have been determined, the traces at depths $z_R$ are moveout corrected dynamically by $$(\Delta T)_{moveout} = t_\infty - T. \quad (27)$$

For the source at zero offset $x = 0$, formula (26) reduces to the standard VSP time shift for aligning primary reflections $$T_{(0, z_R)} = t_\infty - T_B(z_R). \quad (28)$$

In the special case that the receiver is on the surface, $z_R = 0$, we have $T_B(z_R = 0) = 0$, and formula (26) takes the form $$T_{(x, 0)} = \sqrt{t_\infty^2 + \frac{x^2}{v_{RMS}^2(t_\infty)}}. \quad (29)$$

which resembles the standard hyperbolic moveout correction formula for surface seismic data. For a constant velocity medium, $v_{RMS}(t_\infty)=v_O$ for all values of $t_\infty$, where $v_O$ is a constant velocity, and formula (26) takes the special form $$T_{(x,z_R)} = \sqrt{(t_\infty - T_B)^2 + \frac{x^2}{v_0^2}} \text{ , so that} \tag{30}$$

$$t_\infty = T_B(z_R) + \sqrt{T^2(x,z_R) - \frac{x^2}{v_0^2}}.$$

This shows that formula (30) is exactly formula (7) for a constant velocity.

Figure 3:
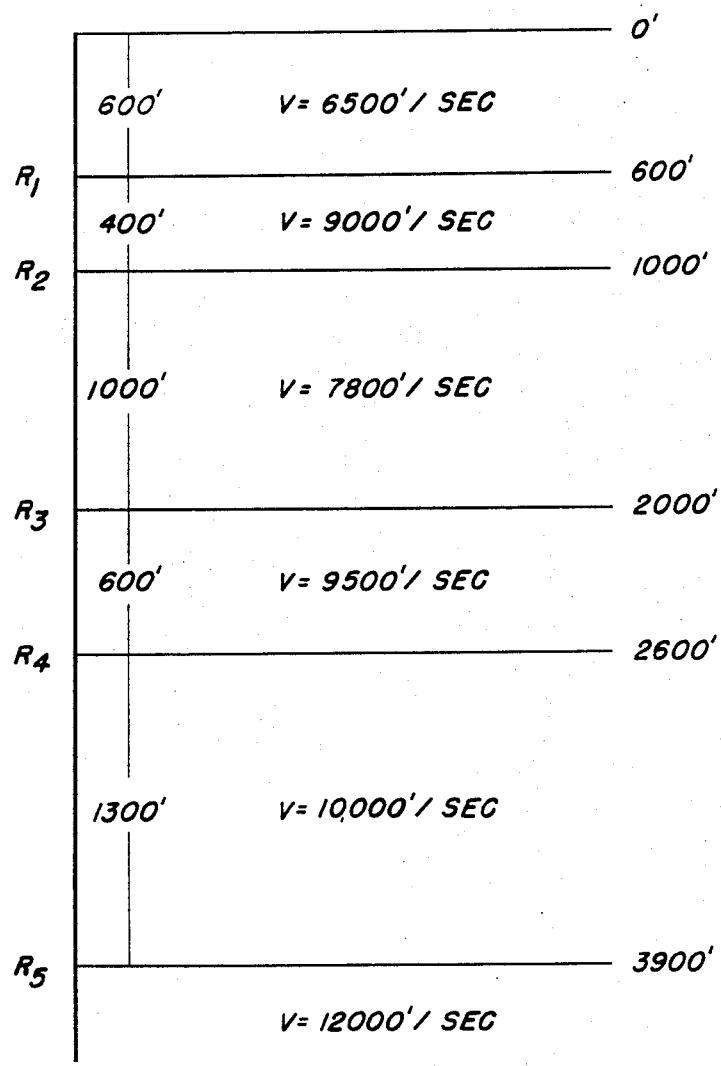
FIG. 3 is a layered model for a synthetic offset VSP.

In order to examine the accuracy of the offset VSP moveout correction formula (26), consider FIG. 3 which depicts a model of five flat reflectors separating layers with the indicated interval velocities. The Sierra VSP ray trace program was used to generate offset VSP data based on this model. Geophones were located in the borehole from depths of 50 feet to 3750 feet in increments of 50 feet and a source was placed on the surface from 100 feet offset to the well to 5000 feet offset to the well in increments of 100 feet. Tables 1 and 2 of Appendix 2 compare the ray trace times $T(x,z_R)$ delivered by Sierra with those computed with formula (26) for reflectors $R_5$ and $R_3$, shown in FIG. 3, for the indicated source offsets x and geophone depths $z_R$. Inspection of these tables indicates sufficient accuracy of the offset VSP moveout correction formula (26) for use toward the required dynamic corrections for offset VSP data traces. Table 3 of Appendix 2 is a compilation of $z_R$, $T_B(z_R)$ and $v_{RMS}[T_B(z_R)]$ together with the two-way, normal incidence travel times for the reflectors $R_1$ through $R_5$ and RMS velocity at these reflector horizons for the model depicted in FIG. 3. Besides the offset x, Table 3 contains the required information to compute the offset VSP travel times listed in Tables 1 and 2 using formula (26). The computation of the RMS velocities $v_{RMS}(t)$ was based on the internal velocities and depths depicted in FIG. 3 with an application of the standard definition $$v_{RMS}^2(t) \equiv \frac{1}{t} \int_0^t v^2(t)dt. \tag{31}$$

In equation (31), v(t) is the interval velocity and t may be either one-way two-way normal incidence travel time.

Figure 4:
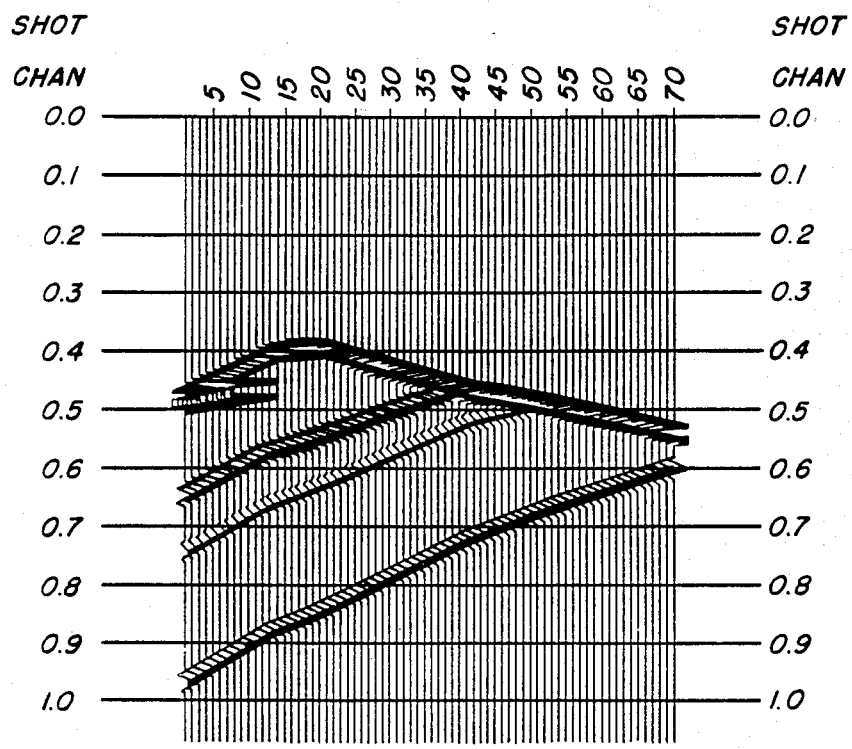
FIG. 4 is a ray trace for a layered model offset VSP.

FIG. 4 shows the results of ray tracing with the Sierra offset VSP algorithm applied to the five reflector model of FIG. 3 with the source offset 3,000 feet. Except for the first break events on each trace, the only other events in the seismogram are upcoming arrivals of the primary reflections from the five interfaces in the model. It is usual practice to mute the first breaks on all traces in processing VSP reflection data and appropriate mutes were applied to the data in FIG. 4 as a conventional preprocessing step. In order to demonstrate the application of formula (26), the reflections from reflector $R_1$ and $R_2$ were removed from the seismogram in FIG. 4 because they were very shallow and the critical offset for reflector $R_1$ is only about 626 feet. The remaining three reflectors were processed by the conventional VSP processing in which a static time shift equal to $T_B(z_R)$ is applied to each trace.

Figure 5:
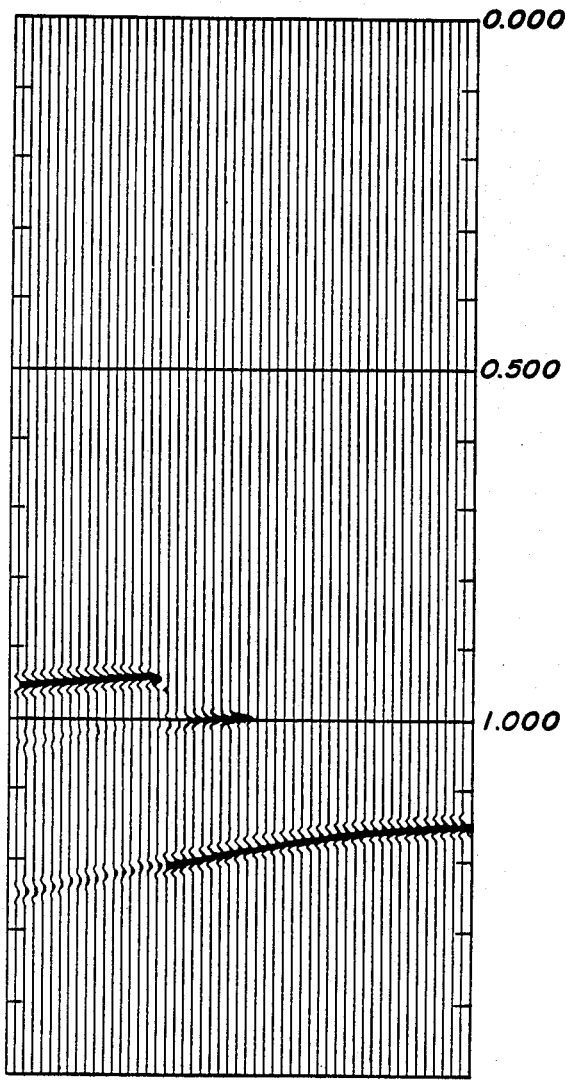
FIG. 5 is a ray trace illustrating prior art processing methods.

FIG. 5 shows the result of applying conventional VSP processing to these data and that a residual correction must be applied to these data to bring reflection events into alignment.

Figure 6:
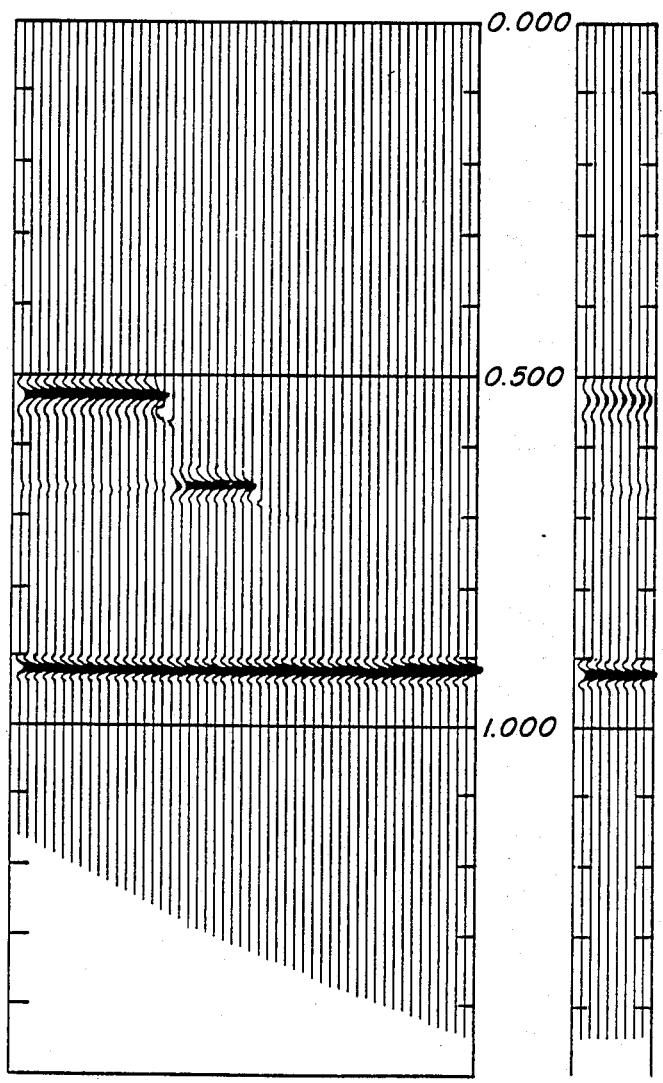
FIG. 6 is a ray trace illustrating offset vertical seismic profile moveout correction applied to model data.

In FIG. 6, the same data have been dynamically corrected using the offset VSP moveout correction formula (26). In the course of moveout correcting these data, the actual values of $v_{RMS}(t_\infty)$ and $v_{RMS}(T_B)$ were supplied in formula (26), as listed in Table 3. Inspection of FIG. 6 shows adequate reflection alignment for stacking. The demonstration of FIG. 6 serves as an indication that dynamic offset VSP moveout correction as prescribed in formula (26) can be successfully applied to offset VSP data traces to align primary reflection events without recourse to ray tracing.

There are several methods of implementing formula (26) to accomplish offset VSP moveout corrections. These methods differ in the selection of velocities and offset VSP traces used in velocity estimation. In implementing formula (26), all times appearing on the right-hand side of formula (26) are converted to two-way times. The two-way first break times $t_B$ are defined by $$t_B(z_{R_k}) \equiv 2 T_B(z_{R_k}), k = 1,2,\ldots,k \text{ and} \tag{32}$$

$$V_{RMS}(t_B) \equiv v_{RMS}(T_B),$$

then the set of $T_B$'s falls naturally into the list of all normal incidence, two-way travel times $t_\infty$. In general, $0 < t_\infty < t_\infty(max)$ with $t_\infty(max)$ defined as the maximum expected normal incidence, two-way time in a seismic section, and it will be true that $t_B < t_\infty(max)$. Reflectors are aligned below the deepest geophone in the well using this analysis. The definition (32) ensures that a single list of times can be constructed for all applications.

The offset VSP data traces are defined to be $D(x,z_R,t)$ and a seismic trace exists at each offset x and depth of geophone $z_R$. This trace is to be transformed into a trace $D_{MO}(x,z_R,t_\infty)$, which will be moveout corrected via formula (27). The time transformation of formula (26) can be represented as a function H [] given by $$T=H[x,z_{R_k},v_{RMS}(t_\infty),t_\infty].$$

The VSP data trace will be sampled in time at a rate $\Delta t$, which will be 1, 2, or 4 milliseconds or some other specified increment. The moveout corrected trace $D_{MO}$ is to be sampled at the same rate as the input trace. If $$t_\infty(i)=i\Delta t, i=0,1,\ldots, I,$$

then for some value $t_\infty(i)$ $$T_i = H[x,z_{R_k},v_{RMS}(t_\infty(i)),t_\infty(i)].$$

The value $T_i$ will, in general, not fall on the times $t_j = j\Delta t, j=1,2,\ldots, J$, appearing in the data trace $D(x,z_{R_k}, t_j)$ and a linear interpolation will be required. Suppose that $T_i$ is in the interval $t_j < T_i < t_{j+1}$, then the moveout corrected trace can be represented by simple linear interpolation as:

$$D_{MO}(X, z_{Rk}, t_\infty(i)) = \frac{(t_{j+1} - T_i)}{\Delta t} D(..., t_j) + \frac{(T_i - t_j)}{\Delta t} D(..., t_{j+1})$$

In the course of computing the moveout correction times, it is necessary to obtain $V_{RMS}(t_B(z_{Rk}))$, as well as $v_{RMS}(t_\infty)$.

Another version of the offset VSP moveout correction is possible. This estimate does not require that the seismic wave, received in the borehole, be extrapolated to the surface. The derivation of the alternate formula will contain the same order of approximations as in equation (19). With reference to FIG. 2, the VSP moveout time estimate is $$T = \sqrt{T_0^2 + \frac{(x - x_R)^2}{V_{RMS}^2(T_0)}} + \sqrt{T_{OG}^2 + \frac{x_R^2}{V_{RMS}^2(T_{OG})}}, \quad (33)$$

where $T_{OG} \equiv \int_{z_G}^{z_0} \frac{dz}{V(z)}$, $T_0 \equiv \int_0^{z_0} \frac{dz}{V(z)}$ and $T_B = T_O - T_{OG}$. The times $T_B$, $T_{OG}$ and $T_O$ are all normal incidence one-way times. The reflection distance $x_R$ can be replaced by $$x_R = \frac{(T_0 - T_B)}{t_\infty - T_B} x, \quad (34)$$

because of equation (15), the identity $t_\infty = 2T_O$ and the travel-time estimate $h = 2T_B/t_\infty$. A simple calculation also shows that $$x - x_R = \frac{x}{2 - h},$$

and with the same estimate for h as used above, we conclude that $$x - x_R = \frac{T_0 x}{t_\infty - T_B}. \quad (35)$$

The quantity $V_{RMS}(T_{OG})$ can be resolved by the well-known rules for decomposition of root mean square velocity $V_{RMS}$, that is $$V_{RMS}^2(T_{OG}) = \frac{T_0 V_{RMS}^2(T_0) - T_B V_{RMS}^2(T_B)}{T_0 - T_B}. \quad (36)$$

Replacement of equations (34), (35) and (36) into equation (33) leads to the alternative VSP moveout correction formula $$T = T_0 \sqrt{1 + \frac{x^2}{(t_\infty - T_B)^2 V_{RMS}^2(T_0)}} + (T_0 - T_B) \sqrt{1 + \frac{(T_0 - T_B)x^2}{(t_\infty - T_B)^2 [T_0 V_{RMS}^2(T_0) - T_B V_{RMS}^2(T_B)]}}. \quad (37)$$

The application of formula (37) is similar to formula (26). The VSP moveout prediction given by formula (26) is slightly better than the corresponding prediction given by formula (37) when the geophone is relatively near the reflector, while formula (37) performs slightly better than formula (26) when the geophone is relatively far from the reflector. More often than not, when the geophone is in a shallow position in the well, reflection data of marginal quality are recorded in VSP's for deep reflector locations, and better reflection data are recorded when the geophone is near the reflector. For these reasons, formula (26) is preferred to formula (37) in most applications.

Several methods of introducing velocities into formula (26) will now be discussed, together with appropriate means of trace selection to complete the velocity analysis.

METHOD I

The most simple method of introducing velocities into formula (26) is to use the RMS velocities derived from the analysis of the first break times $T_B(z_{Rk})$, $k = 1, 2, \ldots, K$. RMS velocities $v_{RMS}(t_\infty)$ for the range $0 < t_\infty < t_B(z_{Rk})$, where $z_{Rk}$ is the deepest geophone location in a well for which a first break time has been obtained are provided. There will generally be reflection events at times greater than this value of t and the required values of $v_{RMS}(t_\infty)$ may be generated by either interpolating the function $v_{RMS}(t_\infty)$ for $t_\infty > t_B$, or by introducing velocities from an external source such as analysis of CDP surface seismic data in the vicinity of the well. If offset VSP moveout corrections are performed with a fixed RMS velocity function, there is a good probability that reflection alignment will not be optimal. For a VSP conducted with a source at a single long offset, imperfect reflection alignment can be troublesome. For an offset VSP with multiple sources, poor reflection alignment is unacceptable because such data will be gathered with the intention of extending reflection horizons away from the well. This leads to the requirement of developing a data adaptive method of obtaining velocities $v_S(t_\infty)$ to replace the RMS velocities appearing in formula (26) in order to align reflectors in an optimal manner.

METHOD II

An offset VSP, constant velocity (CV) stack is defined as follows:

A partition of the interval $[0, t_\infty(max)]$ is selected with J intervals $$[t_\infty(j-1), t_\infty(j)], j = 1, 2, \ldots, J \text{ with } t_\infty(0) = 0.$$

The velocity $v_S(t_\infty)$ will be a linear function on each interval $[t_\infty(j-1), t_\infty(j)]$ and the partition itself may be dictated by knowledge of the function $v_{RMS}(t_\infty)$ obtained from first break times or external data. The velocities $v_S(t_\infty(j))$ at the nodes are going to be determined in a data adaptive process. The velocity $v_S(O)$ can be prescribed by knowledge of near surface conditions. We assume that $v_S(t)$ is a continuous function.

At fixed offset x, define a suite of sweep velocities $v_S(1, n) n = 1, 2, \ldots, N$ in a neighborhood of $v_{RMS}(t_\infty(1))$ and perform the required evaluation of $v_S(t_B)$ for $0 < t_B < t_\infty(1)$. For each $v_S(1, n)$, VSP moveout correct the traces and display them, one display for each $v_S(1, n)$; this will require only several traces at geophone depths near the shallowest portion of the survey. Mute all traces below $t_\infty(1)$. Qualitatively choose the "best fit" $v_s^*(1)$ from the suite of velocities $v_s(1,n)$. Continue the process by prescribing a suite of sweep velocities $v_s(2,n)$, $n=1,2,\ldots,N$ in a neighborhood of $v_{RMS}(t_\infty(2))$ and evaluate $v_s(t_B)$ for $t_\infty(1)<t_B<t_\infty(2)$ using the velocity $v_s^*(1)$. Perform VSP moveout corrections with each of the velocities $v_s(2,n)$ for $0<t_\infty<t_\infty(2)$ and qualitatively choose the best fit $v_s^*(2)$ from the sweep velocities $v_s(2,n)$. Mute all traces below $t_\infty(2)$ during this step of the process. Continue this procedure for every interval $[t_\infty(j-1), t_\infty(j)]$, proceeding with increasing j, one step at a time. At time $t_\infty(j)$, VSP moveout correction will be applied for all traces between $0<t_B<t_\infty(j)$ and the alignment of shallower reflections will be unaltered because velocities $v_S^*(q)$, $q=1,2,\ldots,j-1$ remain fixed. When the process is finished, optimal velocities $v_S^*(j)$, $J=1,2,\ldots,J$ will be determined with which VSP moveout corrections can be performed. For times $t_\infty > t_B(z_{Rk})$, where $z_{Rk}$ is the deepest geophone in the well, $v_S(t_\infty)$ will not be constrained by proximity to $v_{RMS}(t_\infty)$.

METHOD III

For an offset VSP consisting of multiple sources in a line away from a well, the offset VSP CV stack described in Method II above can be applied to data traces for each fixed source offset x. If the depth sampling $z_{Rk}$ is coarse and/or there is particular difficulty with establishing lateral continuity of reflector horizons away from the well, Method II may be applied by displaying CV moveout corrected VSP traces in a window of offsets together with a notation indicating the depth of geophones employed. This will allow visual alignment of reflectors from several offsets at once. The window of offsets can be moved maintaining some degree of overlap. It is tempting to moveout correct offset VSP data by fixing the geophone depth and aligning reflectors for all offsets. This must be done for each depth of the geophone and it is questionable whether a suite of VSP movement corrected profiles could then be stacked over all depths. In other words, it is not sufficient that reflectors align for each offset from a particular geophone depth; they must also align for fixed offset and varying geophone depth.

METHOD IV

The main features of Method II are retained, but, in each interval $[t_\infty(j-1), t_\infty(j)]$, a semblance coherency measure is employed similar to VIP processing. Instead of a suite of displays of moveout corrected traces for each of a set of sweep velocities, a graph of semblance as a function of $t_\infty$ is output. This method has the disadvantage of being very time-consuming, just as with VIP processing, however, it does attempt to automate stacking velocity analysis.

METHOD V

The features of Method II are retained; however, stacking velocity analysis is to be performed in the common reflection point bins, as described hereinafter below. For an offset VSP, the multiplicity of shots should provide the requisite redundancy of reflections on data traces for each bin. The inequalities (46) provide the time windows in each bin for determining optimal reflection alignment through offset VSP CV stacks.

A METHOD FOR STACKING OFFSET VSP DATA IN COMMON REFLECTION POINT BINS

In equation (15), the relationship among the variables reflection point $x_R$, geophone depth $z_R$, reflector depth $z_O$, and source offset from the well x is expressed for flat layers. It is clear from this formula that for a fixed reflector depth and source offset, the subsurface reflection point $x_R$ varies significantly as the geophone depth is varied. In order to illustrate this variability, consider FIG. 7 which is intended to summarize equation (15). A source is placed 2,000' from the well and the geophone depth is varied in the range indicated on the vertical axis. Curves of constant reflector depth are displayed in FIG. 7. The coordinate of the reflection point $x_R$ is the offset distance indicated vertically below the intersection of geophone depth with the reflector curve. Equation (15) refers to a constant velocity medium. In the development of processing for offset VSP data, the variability of subsurface reflection points must be considered as offset VSP traces are combined in procedures such as stacking. For surface seismic data, the concept of a CDP gather more or less assures that, for a fixed CDP gather, reflections are approximately issuing from the same subsurface location.

Figure 7:
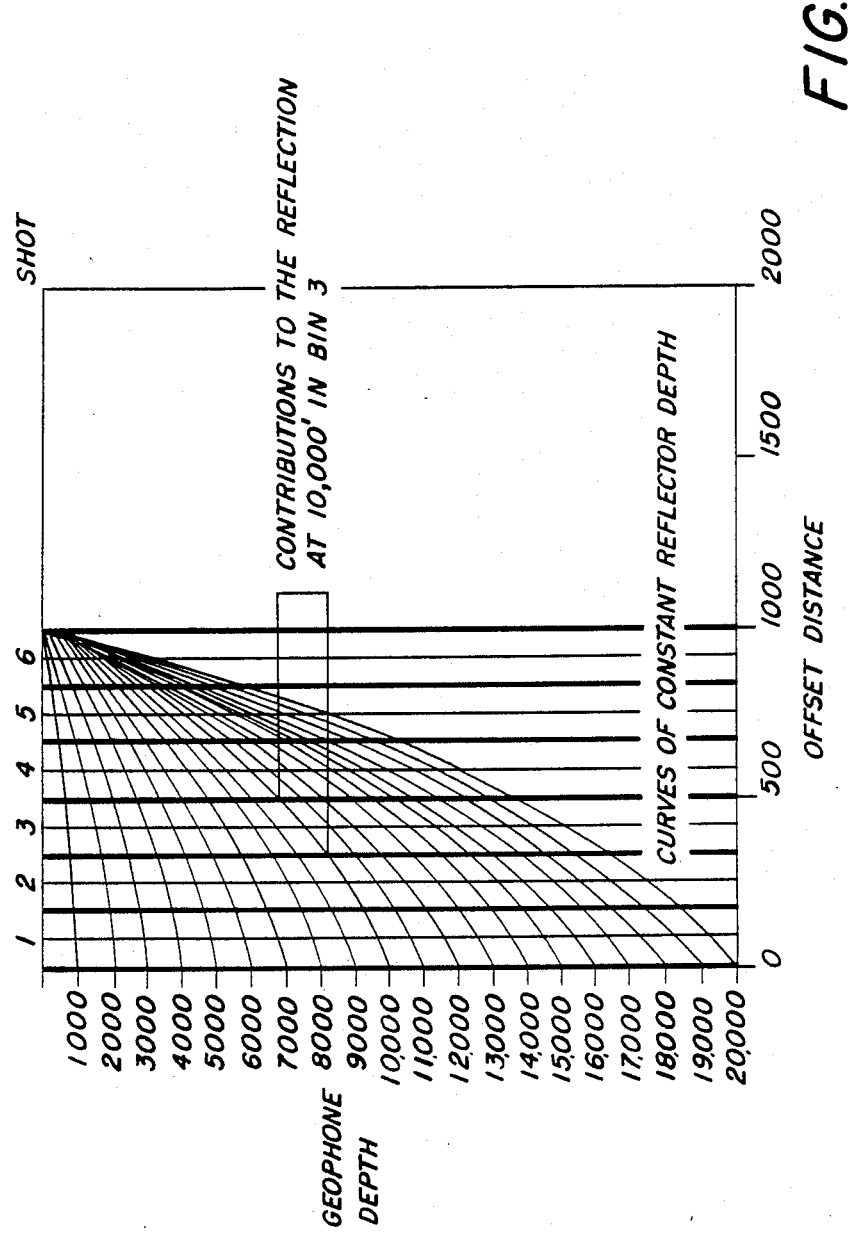
FIG. 7 illustrates bins of common reflection points for offset vertical seismic profile data.

Reflections issuing from approximately the same subsurface location is a concept similar to CDP gather and is demonstrated by the present invention. In FIG. 7, the interval between the well (at offset 0') and the midpoint between the well and the source (at offset 1,000') is partitioned into six equal intervals called bins.

As illustrated in FIG. 7, for the reflector at 10,000 feet of depth, subsurface reflection points will be contained in bin 3, provided we restrict the geophone depths between approximately 6,800 feet and 8,100 feet of depth. This simple illustration serves to define the concept of binning. In practical applications, the velocity will be variable and the reflector depths will be measured in two-way travel times. In order to accommodate this situation, bins of common reflection points are formed based on the travel time information. The goal of this section will be to stack offset moveout corrected VSP data in bins of common subsurface reflection locations.

An important consideration in all that follows is: the stacking analysis applies to VSP movement corrected data. An application of formula (15) with the same estimates stated after equation (19) leads to the formula $$x_R = \left[ \frac{1 - \frac{2T_B(z_R)}{t_\infty}}{2 - \frac{2T_B(z_R)}{t_\infty}} \right] \cdot x_S, \tag{38}$$

where $x_R$ is the subsurface reflection point and $x_S$ is the offset distance of the shot point from the borehole.

In formula (38), $$\lambda \equiv \frac{x_R}{x_S} \text{ and clearly}$$

$$0 < \lambda < \tfrac{1}{2}.$$

Formula (38) now provides the relationship $$t_\infty = 2T_B(z_R) \cdot F(\lambda) = t_B(z_R) \cdot F(\lambda). \tag{39}$$

where definition (32) has been used and $$F(\lambda) = \frac{1 - \lambda}{1 - \partial\lambda} \quad (40)$$

VSP data has been obtained in a well at $z_{Rk}$, k=1,2, . . . , K with the source at a long offset $x_S$, with normal incidence first break times $T_B(z_{Rk})$. In the interval $[0,\frac{1}{2})$, bins are formed as follows:

$$\left[\frac{n}{2N}, \frac{n+1}{2N}\right], n = 0,1,\ldots,N - 1. \quad (41)$$

It is required to chose the number of bins N. If the bins are too coarse, reflections will be stacked over a wide portion of a reflector and will be smeared, whereas, if the bins are too fine, stacking will be nearly at a subsurface point but the time window contributing to the stack may be too small to be useful. Once the number of bins are chosen, the resulting traces are to be stacked and placed at the centers of the bins, namely $$x_R(n) = \left(\frac{n}{2N} + \frac{1}{4N}\right)x_S = \frac{2n+1}{4N} \cdot x_S, n = 0,1,\ldots,N - 1. \quad (42)$$

In formula (40), $\lambda$ has the value n/2N so that $$F(\lambda) = \frac{1 - \frac{n}{2N}}{1 - \frac{n}{N}}.$$

For each VSP trace $z_{Rk}$, we compute the times $$t_\infty(n,k) = t_B(z_{Rk}) \cdot \frac{\left(1 - \frac{n}{2N}\right)}{\left(1 - \frac{n}{N}\right)}; \begin{array}{l} k = 1,2,\ldots,K \\ n = 0,1,\ldots,N \end{array} \quad (43)$$

In order to bin and stack the VSP traces, proceed as follows:
For the trace to be placed at $$\frac{1}{4N} \cdot x_S,$$

mute all traces k=1,2, . . . , K except for the intervals t $(0,k) < t_\infty < t_\infty(1,k)$. These are the "live" portions of the traces and they are subsequently summed over all k. This constitutes the common reflection point stacked trace at $$\frac{1}{4N} \cdot x_S.$$

For the trace to be placed at $$\frac{2n+1}{4N} \cdot x_S,$$

mute all traces k=1,2, . . . , K except for the intervals $$t_\infty(n,k) < t_\infty < t_\infty(n+1, k), n = 1,2,\ldots, N-1. \quad (44)$$

These are the "live" portions of the traces and they are subsequently summed over all k. This constitutes the common reflection point stacked trace at $$\frac{2n+1}{4N} \cdot x_S.$$

The quantity $\lambda$ is strictly defined on $[0,\frac{1}{2})$ and with $$\lambda = \frac{n}{2N},$$

we will be outside the interval of definition when n=N. In equation (43), the value n=N also leads to a computational difficulty. We surmount this difficulty by observing $t_\infty(N,K) = \infty$ in equation (43) and define $t_\infty(N,K)=t_\infty(max)$, where $t_\infty(max)$ is the maximum two-way, normal incidence travel time required for the VSP. The VSP data, $D(x_S, z_R, t)$, will always be gathered for $0 < t < T_{max}$, where $T_{max}$ is maximum listening time.

When the above-defined segments of traces are summed, there will be overlap resulting in fold. Prior to summing, fold on each segment of a trace must be determined and appropriate weights must be applied to the segments of the unstacked data so that all portions of a stacked trace will be balanced. If the fold on a particular segment of a trace is M, then the natural weight to choose for balancing the stacked traced will be 1/M on each portion of a trace contributing to that segment.

Figure 8:
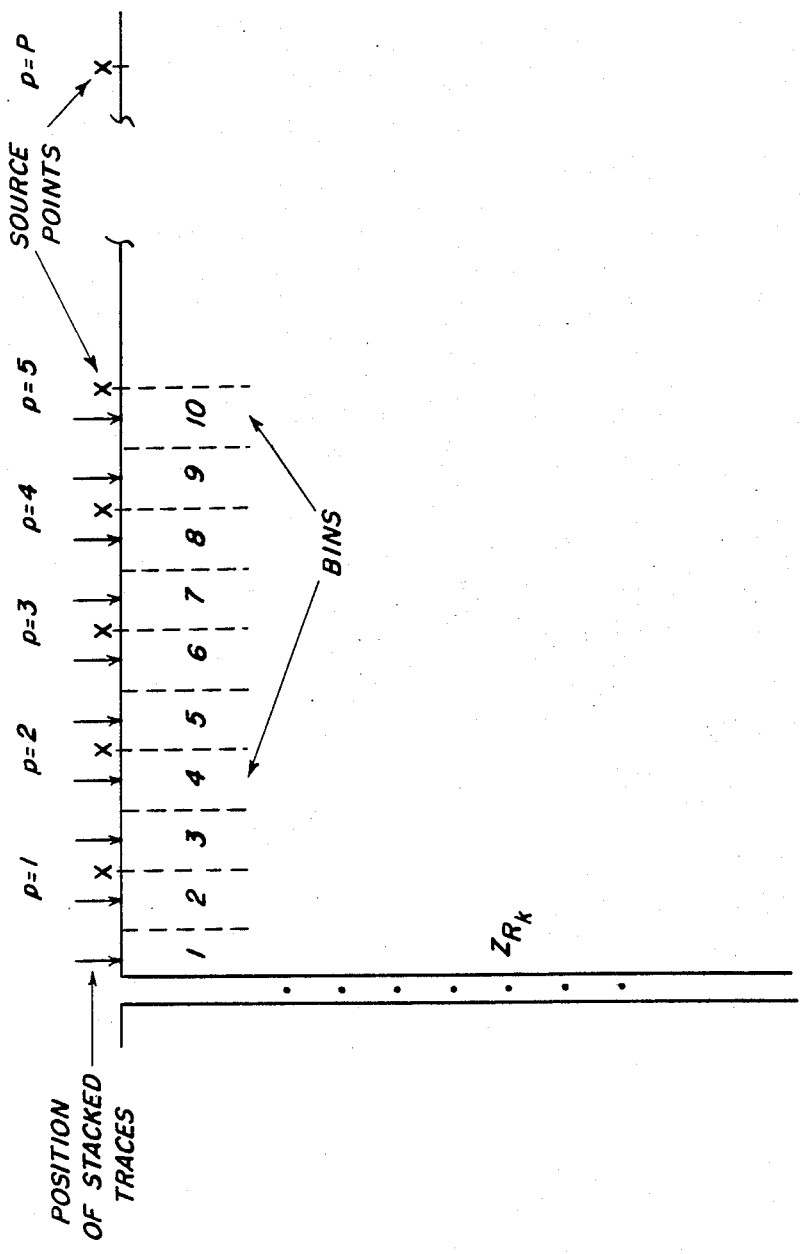
FIG. 8 is an illustration of binning offset vertical seismic profile data with multiple source locations.

If there are many shot points in a line away from the well at offsets $x_S$, we can still use the concepts leading to the relationship (44) in a slightly different context. Let there be P shot points on the surface in a line away from the well, regularly spaced so that $$x_S(p)=p\Delta x_S, p=1,2,\ldots,P$$

where $\Delta x_S$ is some intrinsic spacing of the shot points. In the actual conduct of an offset VSP survey, the shot spacing $\Delta x_S$ must be chosen small enough that the data are not spatially aliased. In this analysis, we assume that a proper choice for the shot spacing has been made. For each shot p, p=1,2, . . . , P, we chose bins as follows p = 1, the bin is $[0,1/2] \Delta x_S$ p = 2, the bins are $[0,1/2] \Delta x_S$ and $[1/2,1]\Delta x_S$ $$p = q, \text{ the bins are } \left[\frac{n}{2}, \frac{n+1}{2}\right]\Delta x_S; \begin{array}{l} n = 0,1,\ldots,q-1. \\ q = 1,2,\ldots P \end{array}$$

as depicted in FIG. 8. Now recall the definition $$\lambda = \frac{x_R}{x_S} = \frac{x_R}{p\Delta x_S}, p = 1,2,\ldots,P.$$

We desire to construct a partition of $[0,\frac{1}{2})$ through the variable $\lambda(n,p)$ given as $$\lambda = \frac{n}{2p}, n = 0,1,\ldots p, \quad (45)$$

which, for each p, delivers partitions of [0,2/1] given by $$\left[\frac{n}{2p}, \frac{n+1}{2p}\right], \begin{array}{l} n = 0,1,\ldots,P-1 \\ p = 1,2,\ldots,P \end{array} \quad (46)$$

The centers of these intervals in the partitions are $$\lambda_m = \frac{1}{2}\left(\frac{n}{2p} + \frac{n+1}{2p}\right) = \quad (47)$$

$$\frac{2n+1}{4p}, \begin{array}{l} n = 0,1,\ldots,P-1 \\ p = 1,2,\ldots,P \end{array}$$

Stacked offset VSP traces will be placed at the centers of the bins which have offset coordinates $$x_R(n,p) = \lambda_m(n,p)x_S = \lambda_m(n,p) \cdot p\Delta x_S = \quad (48)$$

$$\frac{(2n+1)}{4} \cdot \Delta x_S; \begin{array}{l} n = 0,1,\ldots,P-1 \\ p = 1,2,\ldots,P \end{array}$$

Equation (40) can now be invoked to define $$F(\lambda) = F[\lambda(n,p)] = \frac{1 - \frac{n}{2p}}{1 - \frac{n}{p}}. \quad (49)$$

We have offset VSP data traces $D[p\Delta x_S, z_{RK}, t_\infty]$ which have been VSP moveout corrected. Also, we have obtained the first break times $T_B(z_{Rk}), k=1,2,\ldots, K$ at multiple receiver depths in the well; we compute the times $$t_\infty(p,n,k) = t_B(z_{Rk}) \cdot \frac{\left(1 - \frac{n}{2p}\right)}{\left(1 - \frac{n}{p}\right)}, \begin{array}{l} k = 1,2,\ldots,k \\ n = 0,1,\ldots,p. \\ p = 1,2,\ldots,P \end{array} \quad (50)$$

in order to bin and stack the offset VSP traces, we proceed as follows:

For the stacked trace to be placed at offset $$X_R(n) = \frac{(2n+1)}{4}\Delta x_S, n = 0,1,\ldots,P-1$$

mute all offset VSP traces, k=1,2,...K and p=1,2,..., P, except for the time intervals $$t_\infty(p,n,k) < t_\infty < t_\infty(p,n+1,K) \begin{array}{l} n = 0,1,\ldots,P-1 \\ p = 1,2,\ldots,P \end{array}$$

These are the "live" portions of the traces which are subsequently summed over all receiver depths $z_{Rk}$ and shot offsets p $x_s$. This summed trace constitutes the common reflection point stacked trace at x(n). The two comments following equation (44) apply here and the following prescription in the implementation is suggested:

It will probably be most convenient to fix the bin index n, n=0,1,... P—1 when working with offset VSP. The inequality (51) with fixed n, represents all the "live" segments of traces contributing to the stacked trace at x(n).

In the inequality (51), the geophone depth location $z_{Rk}$ will be k=1,2,..., K and the shot offset range will be p=n+1, n+2,..., P. When these portions of the offset VSP traces are sorted out, it is a straightforward matter to determine fold in various time windows.

Figure 9:
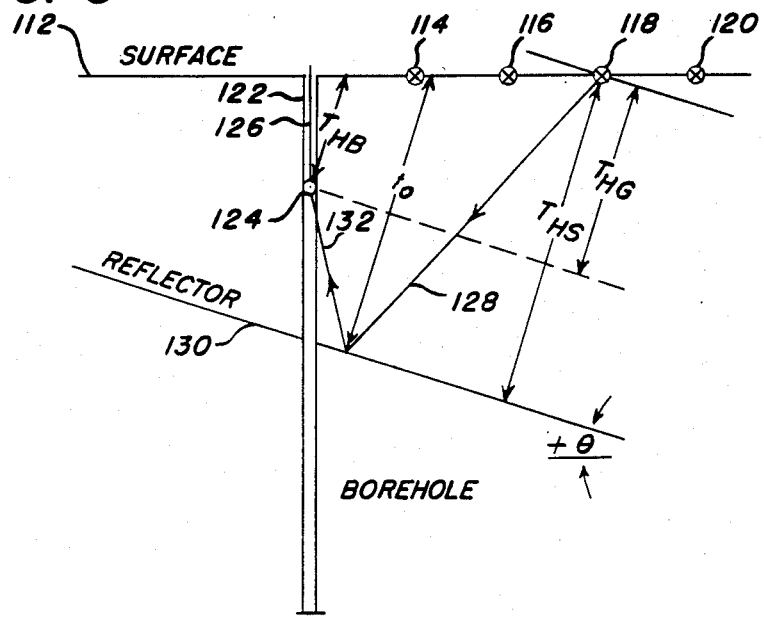
FIG. 9 illustrates a typical offset VSP seismic exploration system for investigation of a subsurface formation which includes a dipping media.

Turning next to FIG. 9, a view of a data acquisition source for acquiring VSP data for a dipping media is shown. Illustrated along the earth's surface 112 are acoustic pulse sources 114, 116, 118 and 120. $X_S$ is the distance measured from borehole 122 to source 118. $X_G$ is the distance measured from borehole 122 in which acoustic pulse receiver 124 is suspended to a respective acoustic pulse source by cable 126. Travel path 128 is illustrated as the path of an acoustic pulse from acoustic source 118 to dipping reflector 130. Path 132 is the path of an acoustic pulse generated by source 114 that has been reflected off dipping reflector 130 and received by geophone 124.

Figure 10:
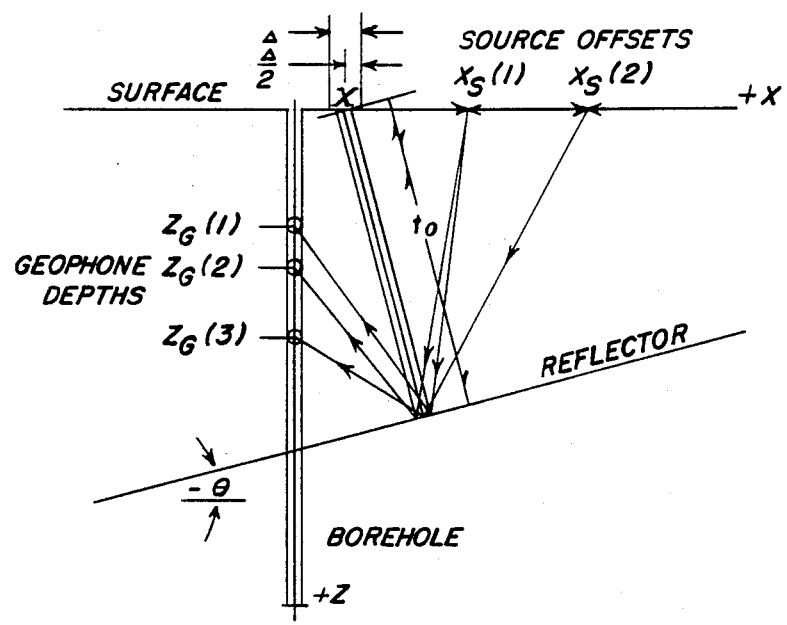
FIG. 10 illustrates a VSP, ZSR common reflection bins and bin boundaries for a dipping reflector.

Referring next to FIG. 10, a qualitative description of VSP for a dipping media may now be provided. Reflection loci from three source-geophone pairs have approximately equal ZSR surface point X and ZSR two-way traveltime $t_o$ for the reflector shown. The configuration of all source location $x_S$ and geophone depths $z_G$ having ZSR reflection loci falling within a distance of $\Delta/2$ to either side of the surface ZSR location X. This constitutes a VSP, ZSR bin of width $\Delta$ at the surface point X for the reflector indicated. The two-way traveltime $t_o$ for these events will be approximately the same. If such events are sorted together from VSP data $D(X_S, z_G, T)$, it is possible to flatten these events to a two-way travel time nearly equal to $t_o$. Once such data are flattened, they may be summed together for a composite representation of the reflector at the surface ZSR location X. The process requires all source location to have a common datum. If this is not the case, a suitable static time shift will be required for VSP seismic traces to restore them to a common datum.

Figure 11:
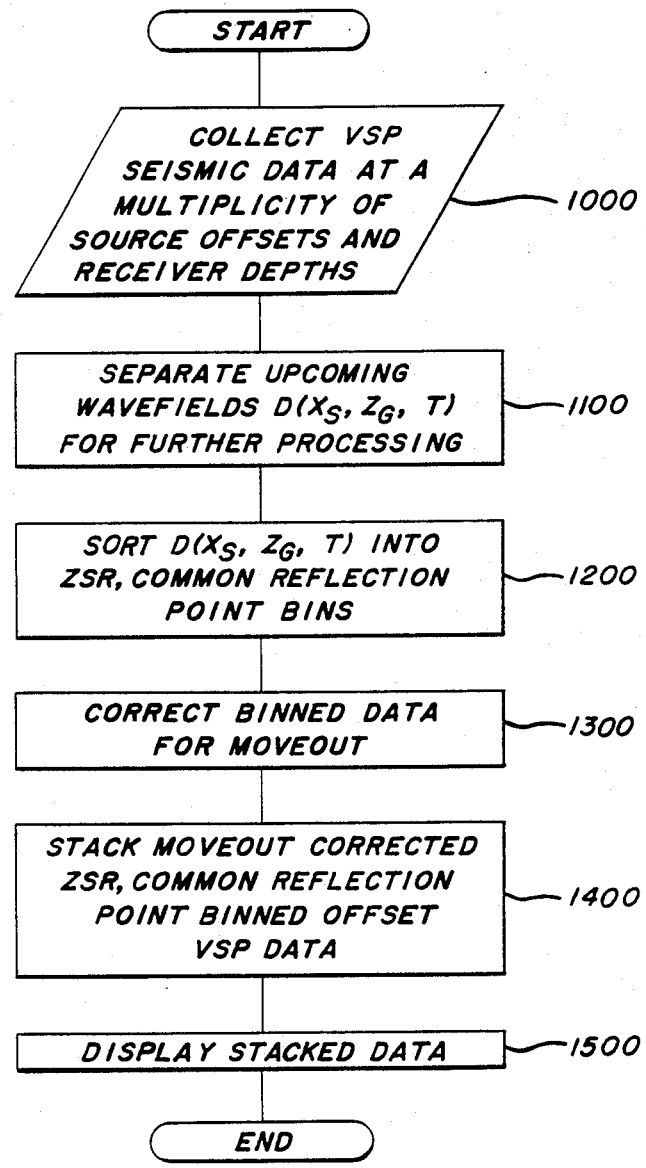
FIG. 11 is a flowchart illustrating the method for bin, moveout correction and stack of offset VSP in media with dip.

Referring next to FIG. 11, the method of bin, moveout correction and stack of offset vertical seismic profile data for a dipping media of the present invention is now described. It should be noted, however, that the method set forth below is described in much greater detail later in this application.

At step 1000, the method of bin, moveout correction and stack of offset VSP data for a dipping media commences with the gathering of seismic data in a VSP at a multiplicity of source offsets and at a multiplicity of receiver depths in a borehole by conventional means. Typically, the gathered seismic data will contain seismic events resulting from both upcoming and downgoing wavefields. Proceeding to step 1100, the upcoming wavefields are separated for further processing. Preferably, the separation will limit the data for further processing to upcoming, primary reflections. Such VSP upcoming primary reflection data may be designated as $D(x_s, z_G, T)$.

Proceeding to step 1200, the VSP data $D(x_s, z_G, T)$ are sorted into zero source receiver (ZSR), common reflection point bins. The sorting of the VSP data $D(x_s, z_G, T)$ into ZSR, common reflection point bins is generally accomplished by generating an auxiliary data set designated as D(n,p,k,T) which is representative of the binned data. The binned data D(n,p,k,T) is then moveout correct to produce seismic traces d(n,p,k,$t_o$) at step 1300. Proceeding to step 1400, the moveout corrected seismic traces d(n,p,k,$t_o$) are stacked in each bin indexed n and placed at bin centers in order to produce the final binned, moveout corrected, and stacked ZSR traces generally designated as d[x(n),$t_o$] for display by conventional means at step 1500.

Figure 12:
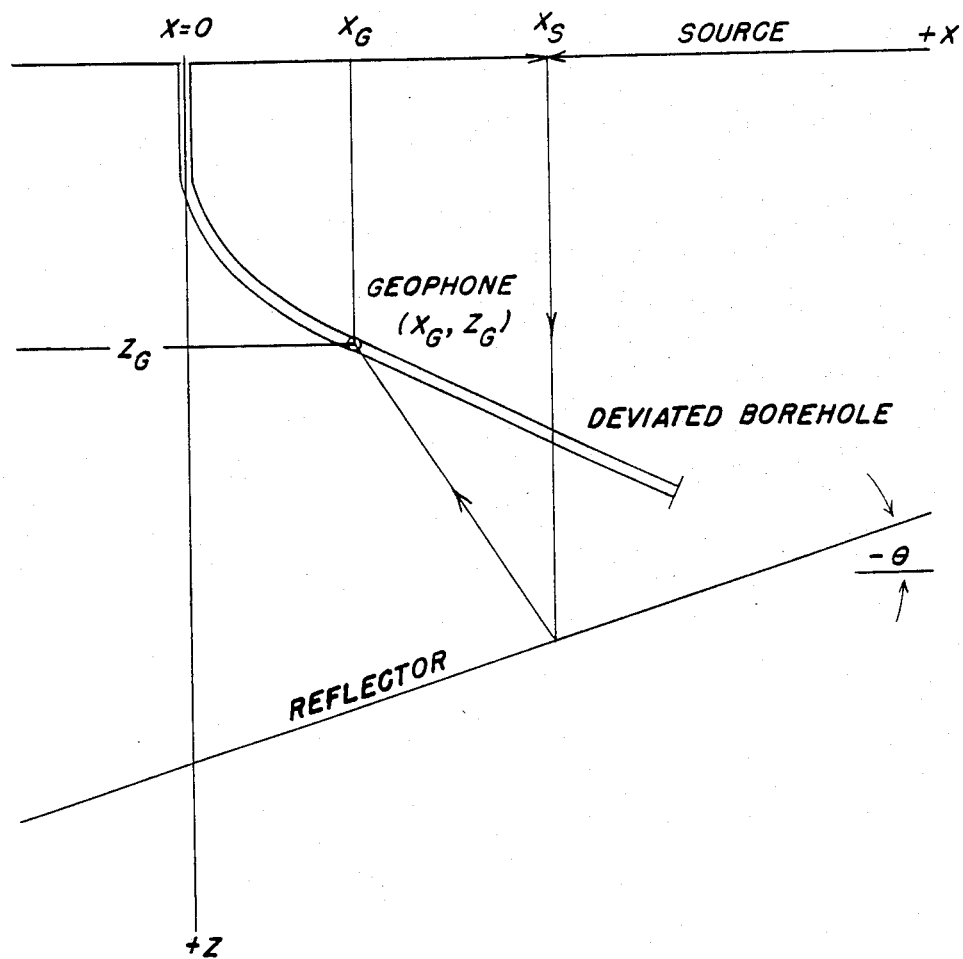
FIG. 12 illustrates the offset VSP seismic exploration apparatus of FIG. 9 operating in a deviated borehole.

Referring next to FIGS. 11 and 12, the above method is now described in greater detail. First, the method for sorting acquired VSP data D($x_S$,$z_G$,T) into ZSR, common reflection point bins in a data dependent manner is hereby set forth. For purposes of this discussion, the notation $z_G(k)$, $k=1,2,\ldots,K$ and $x_s(p)$, $p=1,2,\ldots,P$ is used for the multiplicity of geophone depths and source offsets of the survey respectively.

Surface ZSR bins are first selected with bin boundaries X(n), $n=1,2,\ldots N+1$ as depicted in FIG. 11. Preferably, the bin boundaries shall be equi-spaced so that $[X(n+1)-X(n)]=\Delta$, for $n=1,2,\ldots,N$. As previously mentioned, the spacing $\Delta$ will be data dependent. For example, if the spacing $\Delta$ is very small, little data will be collected in a bin, while if $\Delta$ is very large, much data will be collected in a bin, but it will be smeared. Thus, the data shall be a consideration in determining the bin spacing.

In the preferred embodiment of the invention, the bin boundaries X(1) and X(N+1) shall be determined by bin range criteria which are provided for $x_s(p) \geq 0$ as follows:

for $\theta > 0$, if $x_s(p) > z_G(k)\tan\theta$ : $z_G(k)\tan\theta < X <$ (52)

$$\frac{x_s(p) + z_G(k)\tan\theta}{2}$$

for $\theta > 0$, if $x_s(p) < z_G(k)\tan\theta$ : $\frac{x_s(p) + z_G(k)\tan\theta}{2} < X <$ (53)

$z_G(k)\tan\theta$ for $\theta > 0$, if $x_s(p) = z_G(k)\tan\theta$ : $X = x_s(p)$ (54)

for $\theta < 0$, if $x_s(p) < z_G(k)/\tan|\theta|$ : $z_G(k)\tan\theta < X <$ (55)

$$\frac{x_s(p) + z_G(k)\tan\theta}{2}$$

for $\theta < 0$, if $x_s(p) > z_G(k)/\tan|\theta|$ : $\frac{x_s(p) + z_G(k)\tan\theta}{2} <$ (56)

$X < x_s(p)$

Here, the sign convention for dip $\theta$ is positive for reflectors dipping down from the borehole toward the source and negative for reflectors dipping up from the borehole toward the source. Thus, the reflector depicted in FIG. 11 has a negative dip $\theta$.

The bin boundary X(1) may now be determined by selecting the smallest X, either positive or negative, which will satisfy equations (52) through (56). Furthermore, the bin boundary X(n+1) can be determine by selecting the largest X, either positive or negative, which will satisfy equations (52) through (56).

The upcoming, primary reflection VSP data D($x_S$,$z_G$,T) may now be place in the now determined ZSR, common reflection point bins in the range $X(1) \leq X \leq X(n+1)$ by generating an auxiliary data set $\tilde{D}$ which is determined according to the following equations:

$\tilde{D}(n,p,k,T)=0$, if $T \notin [T(n,p,k), T(n+1,p,k)]$ (57)

$\tilde{D}(n,p,k,T)=D(p,k,T)$, if $T \in [T(n,p,k)], T(n+1,p,k)]$ (58)

It should be noted, however, that for the ease of reproduction of equations (57) and (58), that "n", "p", and "k" stand for "X(n)", "$x_s(p)$" and "$z_G(k)$" respectively.

The data times T(n,p,k) which constitute the boundaries of time intervals [T(n,p,k), T(n+1,p,k)] are calculated from the VSP moveout correction formula:

$$T(n,p,k) = T_{HS}(n,p,k)\sqrt{1 + \frac{[x_s(p) - z_G(k)\tan\theta]^2}{[2T_{HS}(n,p,k) - T_{HG}(p,k)]^2 v_{STK}^2(T_{HS})}} + $$

$$[T_{HS}(n,p,k) - T_{HG}(p,k)]\sqrt{1 + \frac{[T_{HS}(n,p,k) - T_{HG}(p,k)][x_s(p) - z_G(k)\tan\theta]^2}{[2T_{HS}(n,p,k) - T_{HG}(p,k)]^2[T_{HS}(n,p,k)v_{STK}^2(T_{HS}) - T_{HG}(p,k)v_{STK}^2(T_{HG})]}} \quad (59)$$

The velocity $v_{STK}$ appearing in equation (59) is the stacking velocity. It is well established that for media with dip $\theta$, the approximation $v_{STK} = v_{RMS}/\cos\theta$ (60)

is valid, where $v_{RMS}$ is the root mean square velocity along a path normal to the reflector from the source. Further, the time $T_{HG}(p,k)$ is related to the first break time with source offset $x_s(p)$ from the wellhead with geophone depth $z_G(k)$. An explicit means of obtaining this time from VSP data is given below. The time $T_{HS}(n,p,k)$ is provided by the traveltime reduction formula:

$$T_{HS}(n,p,k) = \frac{[t_0(n,p,k) + 2T_{HG}(p,k) - T_{HG}(p,k)] + \sqrt{[t_0(n,p,k) + 2T_{HG}(p,k) - T_{HG}(p,k)]^2 - 4t_0(n,p,k)T_{HG}(p,k)}}{4} \quad (61)$$

and the time $T_{HB}(p,k)$ is related to the first break time in VSP data according to equation (66) below.

For equation (61), the positive sign appearing before the square root symbol must be replaced by a negative sign for the case:

$T_{HS}(1) \geq T_{HG} > 0$ (62)

where:

$$T_{HS}(1) = T_{HG} + \frac{\sqrt{T_{HG}(T_{HB} - T_{HG})}}{2}, \text{ for } T_{HB} \geq T_{HG} \quad (63)$$

This sign change is valid in the time range $t_o[T_{HS}(1)] \leq t_o \leq t_o(start)$, where $$t_o[T_{HS}(1)] = \frac{2T_{HS}(1)[2[T_{HS}(1) - T_{HG}] + T_{HB}]}{[2T_{HS}(1) - T_{HG}]}. \quad (64)$$

For the time range $t_o[T_{HS}1] \leq t_o \leq t_o(max)$, the positive sign (+) is restored. Here, the time $t_o(start)$ is the minimum two-way ZSR traveltime allowable, while $t_o(max)$ is the largest two-way ZSR traveltime in the processed data.

The two-way ZSR times $t_o(n,p,k)$ set forth in equation (61) are determined from the bin transformation formula:

$$t_o(n,p,k) = \frac{2[X(n) - x_s(p)] [[X(n) - x_s(p)]T_{HB}(p,k) - [X(n) - u(p,k)][2T_{HG}(p,k) - T_{HB}(p,k)]]}{[x_s(p) + u(p,k) - 2X(n)][x_s(p) - u(p,k)]} \quad (66)$$

where $u(p,k) = z_G(k) \tan \theta$ and $X(n)$ is restricted to the range prescribed by bin range equations (52) through (56) for $x_s(p)$ and $z_G(k)$. The special case $x_s(p) = z_G(k) \tan \theta = X(n)$ is best avoided by choosing the value of $X(n)$ to be slightly less than $x_s(p)$ and proceed with processing as described above.

Next, the method of VSP moveout correction for media with dip is described. The VSP data $D(x_s, z_G, T)$ is typically sampled in intervals T, where T is 1, 2, or 4 milliseconds. The two-way, ZSR traveltime $t_o$ will be sampled with the same time sample interval $t_o$ as the VSP data. The binned data $D(n,p,k,T)$ are to be moveout corrected to produce seismic traces $d(n,p,k,t_o)$ as follows.

For equations (52) through (55):

$$\bar{d}(n,p,k,t_o) = 0, \text{ for } 0 \leq t_o < t_o(start) \equiv 2T_{HB}(p,k) \quad (67)$$

while for $t_o(start) \leq t_o \leq t_o(max)$, the data sample $\bar{D}(n,p,k,T)$ is to be placed at $\bar{d}(n,p,k,t_o)$, where:

$$(68)$$

$$T = T_{HS}(p,k)\sqrt{1 + \frac{[x_s(p) - z_G(k)\tan\theta]^2}{[2T_{HS}(p,k) - T_{HG}(p,k)]^2 v_{STK}^2(T_{HS})}} +$$

$$[T_{HS}(p,k) - T_{HG}(p,k)]\sqrt{1 + \frac{[T_{HS}(p,k) - T_{HG}(p,k)][x_s(p) - z_G(k)\tan\theta]^2}{[2T_{HS}(p,k) - T_{HG}(p,k)]^2[T_{HS}(p,k)v_{STK}^2(T_{HS}) - T_{HG}(p,k)v_{STK}^2(T_{HG})]}}$$

where $v_{STK} \equiv v_{RMS}(.)/\cos\theta$ $$T_{HS}(p,k) = \frac{[t_o + 2T_{HG}(p,k) - T_{HB}(p,k)] + \sqrt{[t_o + 2T_{HG}(p,k) - T_{HB}(p,k)]^2 - 4t_o T_{HG}(p,k)}}{4} \quad (69)$$

The selection of the (+) sign before the square root symbol in equation (69) is valid unless the conditions set forth in equation (61) are satisfied. If the conditions of equation (61) are satisfied, the (+) sign is replaced by a (−) sign. The conditions of equation (61) will typically be prevailing when the dip $\theta$ of the formation is negative.

For bin range equation (56), equations (68) and (69) are valid but $t_o(start) = 0$, for which case $T_{HS} = 0$, and $T_{HG}(p,k)$ will be negative.

Next, in order to generate the seismic trace $\bar{d}(n,p,k,t_o)$, interpolation of the data $\bar{D}(n,p,k,T)$ is necessary. Linear interpolation is possible, but higher order interpolation operators are more desirable. A four point operator obtained from a least square error minimization algorithm has been utilized with favorable results.

The goodness of the moveout correction performed above depends on the parameters $v_{STK}(.)$ and $\theta$ and can be judged by the flatness of the moveout corrected data $\bar{d}(n,p,k,t_o)$ for each bin indexed n. Preferably, it is desirable to judge the goodness of reflector alignment by viewing the moveout corrected data from selected bins for a suite of parameters $v_{STK}(.)$ and $\theta$, followed by selecting those parameters which best flatten the data. This process is familiar to those skilled in the art of surface seismic data processing and is generally known as a Constant Velocity (CV) stack. However, it should be noted that the actual implementation of CV stacks on VSP data will differ from traditional surface seismic data processing. Referring back to equation (68), an optimal stacking velocity $v_{STK}(.)$ is required at times $T_{HS}$ and $T_{HG}$ when $T_{HS} > T_{HG}$. For VSP data, several CV stacks should be investigated with progressively increasing time. For each CV stack, $v_{RMS}(T_{HG})$ will be considered known. With this value fixed, a suite of parameters $v_{RMS}(T_{HS})$ may be examined to establish which among them best flattens VSP reflection data.

When interval velocities $v_m$, for $z(m) \leq z \leq (m+1)$, $m = 0, 1, 2, \ldots, M$, with $z(o) = 0$, at the well are available, estimates of $T_{HG}(p,k)$, $T_{HB}(p,k)$, $v_{RMS}(T_{HG})$ and $v_{RMS}(T_{HS})$ can be computed for a prescribed dip $\theta$ when $\theta = \theta(x_s, z) \equiv \theta(p,k)$. Interval velocities $v_m$ can be obtained from first break times in a zero offset VSP according to the following:

$$T_{HG}(p,k) = \frac{x_s(p)\sin\theta}{v_0} + \sum_{p=1}^{m} \frac{[z(p) - z(p-1)]\cos\theta}{v_{p-1}} + \quad (70)$$

$$\frac{[z_G - z_m]\cos\theta}{v_m} \quad (71)$$

$$T_{HB}(p,k) = T_{HG} \Big|_{x_s = z_G \tan\theta}$$

$$v_{RMS}^2(T_{HG}) = \quad (72)$$

$$\frac{v_0 x_s(p)\sin\theta + \sum_{p=1}^{m}[z(p) - z(p-1)]v_{p-1}\cos\theta + v_m[z_G - z(m)]\cos\theta}{T_{HG}(p,k)}$$

for $z(m) \leq z_G \leq z(m+1)$, with $x_s < -z(1) \cot \theta$, if $\theta > 0$ and $x_s > z_o(1) \cot \theta$, if $\theta > 0$. If the last two inequalities are not satisfied, consideration must be given to increasing the value of $z(1)$.

$$v_{RMS}^2(T_{HS}) = \quad (73)$$

-continued $$v_0 x_s(p)\sin\theta + \frac{\sum_{p=1}^{m'} [z(p) - z(p-1)]v_{p-1}\cos\theta + v_{m'}[z - z(m')]\cos\theta}{T_{HS}(p,k)}$$

where $T_{HS}(p,k)$ is calculated according to equation (69) and where depth z satisfies:

$$T_{HS}(p,k) = \frac{x_s(p)\sin\theta}{v_0} + \sum_{p=1}^{m'} \frac{[z(p) - z(p-1)]}{v_{p-1}} \cos\theta + \frac{[z - z(m')]}{v_{m'}} \cos\theta \quad (74)$$

for $z(m') \leq z \leq z(m'+1)$ and $z \geq z_G(k)$ and where the value of $\theta$ associated with equation (73) is $\theta(x_s, z)$.

In an alternative embodiment of the invention, $T_{HG}$, $T_{HB}$ and $v_{RMS}(T_{HG})$ may also be estimated from the first break times $T_B(x_s, z_G)$ obtained with VSP data when there are a sufficient number of source offsets $x_s$ and geophone depths $z_G$ in the survey by obtaining an estimation of these variables according to the following:

$$T_B^2(x_s, z_G) = T_{HG}^2(x_s, z_G) + \frac{(x_s - z_G\tan\theta)^2}{v_{STK}^2(T_{HG})} \quad (75)$$

and $$T_{HB} = T_B(x_s, z_G)\Big|_{x_s = z_G\tan\theta} \quad (76)$$

In another embodiment of the invention, restrictions on the moveout correction determined according to equation (68) are imposed to avoid the well known phenomenon known as NMO stretch. The quantity S is defined by:

$$S \equiv \frac{|x_s - z_G\tan\theta|}{(2T_{HS} - T_{HG})v_{STK}} \quad (77)$$

The quantity APSTOP is selected in the range $\frac{1}{2} \leq $ APSTOP$\leq 2$. The precise APSTOP value to be selected depends on the data adaptive parameters and those skilled in the art of seismic data processing would be able to select a value of APSTOP depending on the particular example. If $S < $ APSTOP, the data are moveout corrected according to equation (68). If $S \geq $ APSTOP, then $d(n,p,k,t_o)=0$. Appropriate tapers should be employed when muting occurs for $S \geq $ APSTOP.

Next, the method of stacking the moveout corrected VSP DATA in ZSR common reflection point bins is hereby described. Moveout corrected VSP data $d(n,p,k,t_o)$ are stacked in each bin indexed n and placed at bin centers according to:

$$x(n) = X(1) + ((2n-1)\Delta/2), \text{ for } n=1,2,\ldots,N, \quad (78)$$

The final binned, moveout corrected, and stacked simulated ZSR traces $d[x(n), t_o]$, at each $x(n)$ may then be determined according to:

$$d[x(n), t_o] = \sum_{p,k} W_n d(n,p,k,t_o) \quad (79)$$

Here, the factor $W_n$ is a weight determined by counting the total number of non-zero contributions to the sum at $t_o$ in the bin indexed n and by normalizing $\overline{d}$ by this count.

The above described method of bin, moveout correction and stack for offset VSP data acquired for a dipping media may be modified for those occasions when the borehole is deviated. Referring now to FIG. 12, an additional step of performing a deviation survey to identify the position $(x_G, z_G)$ of the geophone along the curved borehole. The position of the geophone requires modification of several of the equations set forth above.

Bin range equations (52) through (56) must be modified to determine the minimum and maximum bin boundaries X(1) and X(N+1):

for $\theta > 0$, if $x_s(p) > z_G(k)\tan\theta + x_G(k) : z_G(k)\tan\theta + $ (80)

$$x_G(k) < X < \frac{x_s(p) + z_G(k)\tan\theta + x_G(k)}{2}$$

for $\theta > 0$, if $x_s(p) < z_G(k)\tan\theta + $ (81)

$$x_G(k) : \frac{x_s(p) + z_G(k)\tan\theta + x_G(k)}{2} < X < z_G(k)\tan\theta + x_G(k)$$

for $\theta > 0$, if $x_s(p) = z_G(k)\tan\theta + x_G(k) : X = x_s(p)$ (82)

for $\theta < 0$, if $x_s(p) < z_G(k)/\tan|\theta| + x_G(k) : z_G(k)\tan\theta + $ (83)

$$x_G(k) < X < \frac{x_s(p) + z_G(k)\tan\theta + x_G(k)}{2}$$

for $\theta < 0$, if $x_s(p) > z_G(k)/\tan|\theta| + $ (84)

$$x_G(k) : \frac{x_s(p) + z_G(k)\tan\theta + x_G(k)}{2} < X < x_s(p)$$

The bin boundaries X(1) and X(N+1) are the smallest and largest X which will satisfy equations (80) through (84).

The method for bin, moveout correction and stack for the case of deviated boreholes shall be the same as the straight borehole case provided certain transformations are defined. Equi-spaced bins of length $\Delta$ are defined as before, with $$X(n) = X(1) + (n-1)\Delta, \text{ for } n = 1, 2, \ldots, N+1 \quad (85)$$

$$x(n+1) = X(1) + N\Delta \quad (86)$$

However, the following definitions:

$$\overline{X}(n,k) = X(n) - X_G(k) \quad (87)$$

and $$\overline{x}_s(p,k) = x_s(p) - x_G(k), \quad (88)$$

where $\overline{x}_s(p,k) \geq 0$, shift the coordinate origin from the wellhead at $x=0$ to the geophone offset $x_G(k)$ associated with geophone depth $z_G(k)$. Bin range equations (80) through (84) become:

for $\theta > 0$, if $\overline{x}_s(p,k) > z_G(k)\tan\theta : z_G(k)\tan\theta < \overline{X} < $ (89)

$$\frac{x_s(p,k) + z_G(k)\tan\theta}{2}$$

for $\theta > 0$, if $\overline{x}_s(p,k) < z_G(k)\tan\theta : \frac{\overline{x}_s(p,k) + z_G(k)\tan\theta}{2} < $ (90)

-continued $$\text{for } \theta > 0, \text{ if } \bar{x}_s(p,k) = z_G(k)\tan\theta : \bar{X} = \bar{x}_s(p,k) \quad (91)$$

$$\bar{X} < z_G(k)\tan\theta$$

$$\text{for } \theta < 0, \text{ if } \bar{x}_s(p,k) < z_G(k)/\tan|\theta| : z_G(k)\tan\theta < \quad (92)$$

$$\bar{X} < \frac{x_s(p,k) + z_G(k)\tan\theta}{2}$$

$$\text{for } \theta < 0, \text{ if } \bar{x}_s(p,k) > z_G(k)/\tan|\theta| : \frac{x_s(p,k) + z_G(k)\tan\theta}{2} < \quad (93)$$

$$\bar{X} < \bar{x}_s(p,k)$$

Similarly, in equation (59), $x_s(p,k)$ is replaced by $\bar{x}_s(p,k)$ while $T_{HG}$ and $v_{RMS}(T_{HG})$, as defined by equations (70) and (72) are replaced by $\bar{T}_{HG}$ and $\bar{v}_{RMS}(T_{HG})$ as defined below:

$$\bar{T}_{HG}(x_s,z_G) = \frac{x_s\sin\theta}{v_o} + \sum_{p=1}^{m} \frac{[z(p) - z(p-1)]}{v_{p-1}} \cos\theta + \quad (94)$$

$$\frac{[z_G - z(m) - x_G\tan\theta]}{v_m} \cos\theta$$

for $z(m) \geq \bar{z}_G \geq z(m+1)$, $\bar{z}_G \equiv z_G - x_G - x_G\tan\theta$; with $x_s < -z(1)\cot\theta$, if $\theta < 0$ and $x_s > -z(1)\cot\theta$, if $\theta > 0$.

$$v_{RMS}(\bar{T}_{HG}) = \quad (95)$$

$$\frac{v_o x_s\sin\theta + \sum_{p=1}^{m}[z(p) - z(p-1)]v_{p-1}\cos\theta + [z_G - z(m) - x_G\tan\theta]\cos\theta}{\bar{T}_{HG}}$$

Thus, for equation (61), $T_{HG}$ should be replaced by $\bar{T}_{HG}$ as given by equation (94) and $T_{HB}$ as given in equation (71) should be replaced by $\bar{T}_{HB}$ according to:

$$\bar{T}_{HB} = \frac{(x_G + z_G\tan\theta)\sin\theta}{v_o} + \sum_{p=1}^{m}\frac{[z(p) - z(p-1)]}{v_{p-1}}\cos\theta + \quad (96)$$

$$\frac{[z_G - z(m) - x_G\tan\theta]}{v_m}\cos\theta$$

for $z(m) \leq \bar{z}_G \leq z(m+1)$, $\bar{z}_G \equiv z_G - x_G \tan\theta$; with $x_s < -z(1)\cot\theta$, if $\theta < 0$ and $x_s > -z(1)\cot\theta$, if $\theta > 0$. The branch determination rules for the election of $(+)$ or $(-)$ before the square root symbol in equation (59) must be modified by replacing $T_{HG}$ and $T_{HB}$ by $\bar{T}_{HG}$ and $\bar{T}_{HB}$ respectively. The calculation of $v_{RMS}(T_{HS})$ needs no modification because $v_{RMS}(T_{HS})$ is invariant for the coordinate shift.

The bin transformation formula set forth in equation (66) is modified for deviated boreholes by replacement of $X(n)$ and $x_s(p)$ by $\bar{x}(n,k)$ and $\bar{x}_s(p,k)$ respectively. $\bar{X}(n,k)$ must be restricted by the modified bin range equations (89) through (93).

For the case of deviated boreholes, the VSP moveout correction must by modified according to the following. For the case of deviated boreholes, when the binned data $D(n,p,k,T)$ are prepared for moveout correction, for fixed $x_s(p)$ and $z_G(k)$, there is a portion of a seismic trace in a bin indexed by n. This seismic trace should be moveout corrected with equations (68) and (69) for which $x_s(p)$ is replaced by $\bar{x}_s(p,k)$, $T_{HG}(p,k)$ is replaced by $\bar{T}_{HG}(p,k)$ and $T_{HB}(p,k)$ is replaced by $\bar{T}_{HB}(p,k)$ as previously set forth. Corresponding to the time $\bar{T}_{HG}(p,k)$ as given above, there is an RMS velocity, $\bar{v}_{RMS}(\bar{T}_{HG})$, as set forth in given in equation (95) which should replace $v_{RMS}(T_{HG})$. For all times $T_{HS}$, as generated by equation (69), it is acceptable to use equation (73) to estimate $v_{RMS}(T_{HS})$. For bin range equations (89) through (92), the two-way ZSR start time $t_o(start)$ is replaced by $$t_o(start) = 2\bar{T}_{HB} \quad (97)$$

where $\bar{T}_{HB}$ is provided by equation (96). If conditions under bin range equation (93) are prevalent, then $t_o(start) = 0$, for which $T_{HS} = 0$.

For the case of deviated boreholes, moveout corrected data $d(n,p,k,t_o)$ are stacked in each bin indexed n and placed at bin centers:

$$x(n) = X(1) + ((2n-1)\Delta/2), \text{ for } n = 1,2,\ldots,N \quad (98)$$

Although processing is executed in shifted variables $\bar{X}(n,k)$, the final placement of seismic traces will be at coordinates of the unshifted variables. Thus, $$X(n) = \bar{X}(n,k) + x_G(k) \quad (99)$$

for each geophone offset $x_G(k)$, $k = 1,2,\ldots,K$ corresponding to the geophone depth $z_G(k)$.

Figure 13:
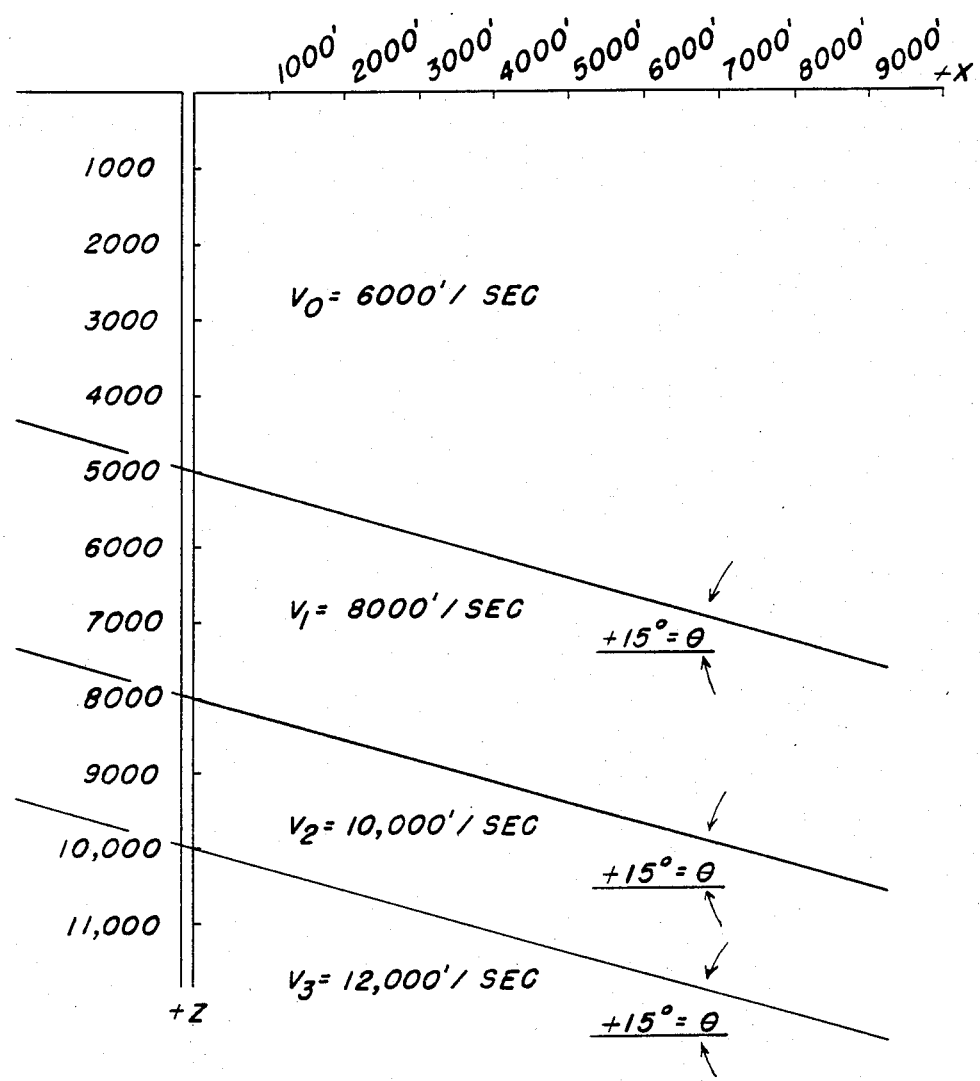
FIG. 13 illustrates a subsurface formation containing three dipping reflectors.
Figure 14:
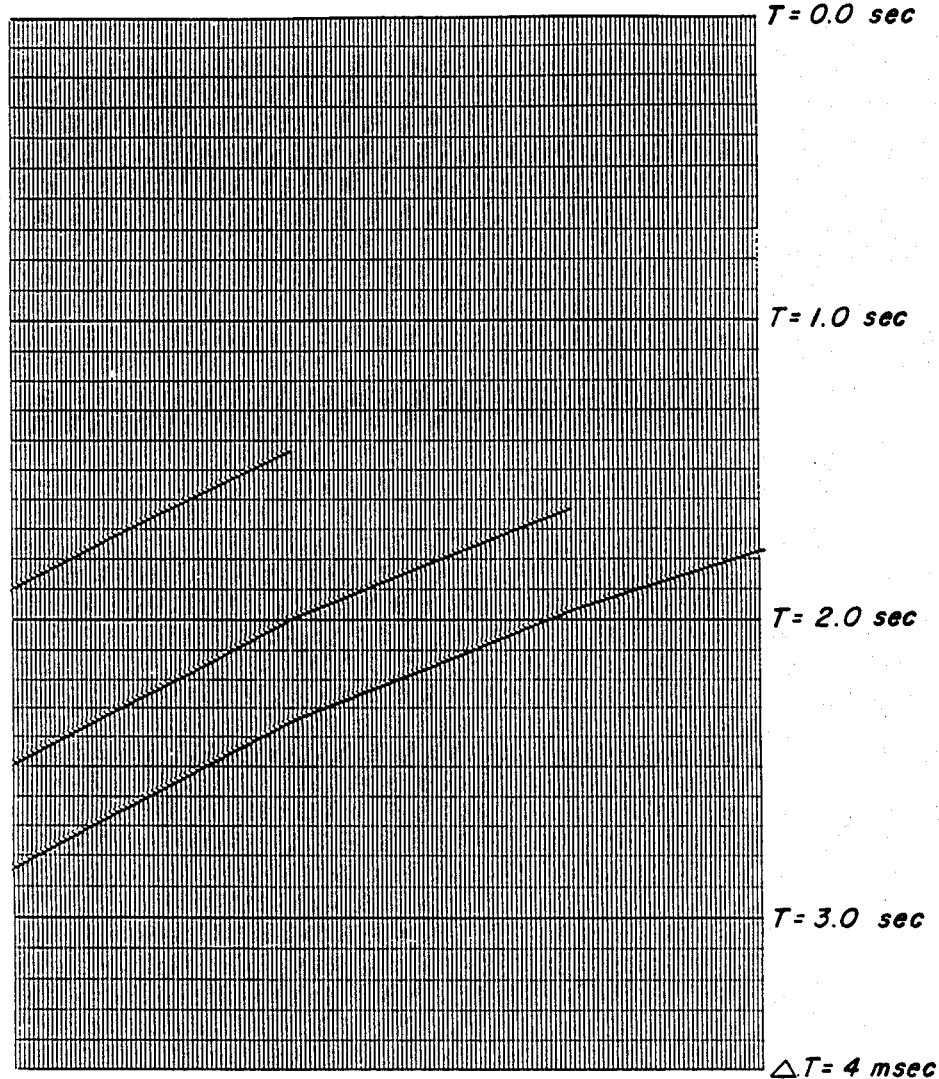
FIG. 14 illustrates seismic data acquired during exploration of the formation of FIG. 13.
Figure 15:
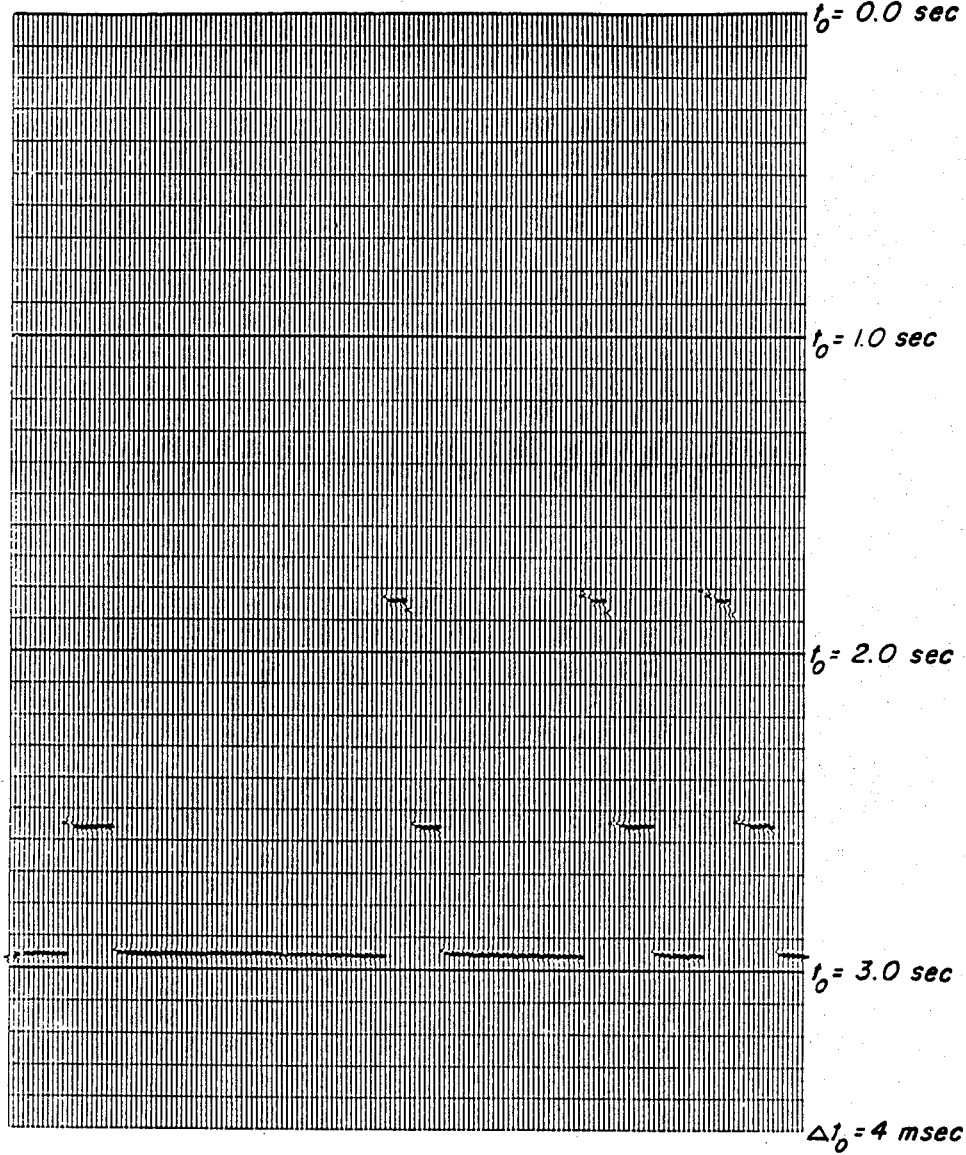
FIG. 15 illustrates the data of FIG. 14 after binning and VSP moveout correction according to the methods of the present invention for the bin centered at 3530' offset.
Figure 16:
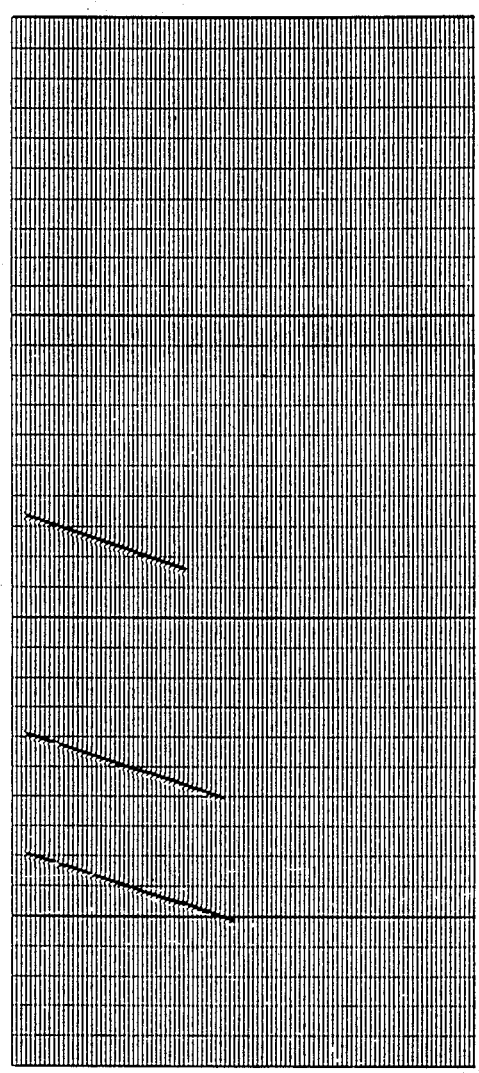
FIG. 16 illustrates the data of FIG. 14 after binning, moveout correction and stacking according to the methods of the present invention.

Turning next to FIG. 13, a physical model containing three dipping reflectors is illustrated. The dip is +15 degrees and offset VSPs are acquired for a straight borehole with geophone depths between 2,000' and 10,000' every 50'. There are 8 source offsets from 1,000' to 8,000' every 1,000'. The various interval velocities and reflector depths at the borehole are provided as well. The VSP data acquired at 7,000' is shown in FIG. 14. The VSP data of FIG. 14 has already been separated to contain primary reflection events only for the indicated range of geophone depths. The results of binning and VSP moveout correction of the data of FIG. 14 according to the method of the present invention for a bin centered at +3,530' offset may be seen by reference to FIG. 15. The binned, VSP moveout corrected and stacked data from all geophone depths and source offsets may be seen be reference to FIG. 16.

In yet another embodiment of the invention, it is contemplated that the method of determining reflection loci, bin transformation, traveltime reduction and VSP moveout correction may improved by utilization of an improved estimate factor which may be defined according to Equation (100) as set forth below.

$$\gamma = \frac{v_{RMS}^2(T_{HG})}{v_{RMS}^2(T_{HS})} \quad (100)$$

While the application of the improved estimate does not modify the previously determined formula for bin range, the formula for reflection loci, bin transformation, traveltime reduction and VSP moveout correction are revised as set forth below. reduction and VSP moveout correction are revised as set forth below.

For reflection loci:

$$X = \frac{(T_{HS} - \gamma T_{HG}) + T_{HS}Z_G \text{TAN}\theta}{(2T_{HS} - \gamma T_{HG})}; \quad (101)$$

For bin transformation:

$$T_{HS}V^2_{RMS}(T_{HS}) = \frac{T_{HG}V^2_{RMS}(T_{HG}) \cdot (X_S - X)}{(X_S + Z_G \text{TAN}\theta - 2X)} \quad (102)$$

For traveltime reduction:

$$t_o = \frac{2T_{HS}[2T_{HS} - (1 + \gamma)T_{HG} + T_{HG}^*]}{(2T_{HS} - \gamma T_{HG})} \quad (103)$$

For VSP moveout correction:

$$T = T_{HS}\sqrt{1 + \frac{(X_S - Z_G \text{TAN}\theta)^2}{(2T_{HS} - \gamma T_{HG})^2 V^2_{RMS}(T_{HS})/\cos^2\theta}} + \quad (104)$$

$$(T_{HS} - T_{HG})\sqrt{1 + \frac{(T_{HS} - \gamma T_{HG})^2(X_S - Z_G \text{TAN}\theta)^2}{(2T_{HS} - \gamma T_{HG})^2(T_{HS} - T_{HG})\left[\frac{T_{HS}V^2_{RMS}(T_{HS})}{\cos^2\theta} - \frac{T_{HG}V^2_{RMS}(T_{HG})}{\cos^2\theta}\right]}}$$

While the methods set forth above are described for vertical seismic profile exploration in which vertical seismic profile data is produced by the generation of seismic energy by a multiplicity of acoustic pulse generators located on the surface, reflection by a dipping meda and recordation by a multiplicity of acoustic pulse receiver located in a borehole beneath the earth's surface, it should be clearly understood that the techniques described herein are equally applicable to the production of inverse VSP data where seismic energy is generated by a multiplicity of acoustic pulse receivers located in the borehole, reflected by the dipping media of seismic and recorded by a multiplicity of acoustic pulse receivers located on the surface.

Thus, a method for segregating and stacking offset vertical seismic profile data for a dipping media acquired by the generation of seismic energy at a multiplicity of source offsets from a borehole and the collection of offset VSP data by an acoustic detector at a multiplicity of geophone depths for each source offset. The recorded data is sorted into Zero Source-Receiver (ZSR), common reflection point bins. Data from each offset VSP, ZSR common reflection point gather are dynamically moveout corrected with data adaptive parameters including reduced direct arrival time, dip and stacking velocities. The moveout corrected VSP data are then stacked.

While the present invention has been illustrated by way of preferred embodiments, it is to be understood that the present invention is not thereto but is limited only by the scope of the following claims.

What is claimed is:

1. A method for binning, moveout correcting and stacking vertical seismic profile data for a dipping media comprising the steps of:
   (a) receiving vertical seismic profile data from an acoustic pulse receiver located in a borehole beneath the earth's surface and horizontally offset from any acoustic pulse generator on the surface causing acoustic pulses reflected from said dipping media to be received by said acoustic pulse receiver or receiving vertical seismic profile data from acoustic pulse receivers located on the earth's surface horizontally offset from a borehole containing an acoustic pulse generator causing acoustic pulses reflected by said dipping media to be received by said acoustic pulse receivers located on the earth's surface;
   (b) selecting zero source-receiver, common reflection point bins for said received vertical seismic profile data according to the following bin range criteria;

for $\theta > 0$, if $x_s(p) > z_G(k)\tan\theta$ : $z_G(k)\tan\theta < X < \frac{x_s(p) + z_G(k)\tan\theta}{2}$;

for $\theta > 0$, if $x_s(p) < z_G(k)\tan\theta$ : $\frac{x_s(p) + z_G(k)\tan\theta}{2} < X < a_G(k)\tan\theta$;

for $\theta > 0$, if $x_s(p) = z_G(k)\tan\theta$ : $X = \bar{x}_s(p)$;

for $\theta < 0$, if $x_s(p) < z_G(k)/\tan|\theta|$ : $z_G(k)\tan\theta < X < \frac{x_s(p) + z_G(k)\tan\theta}{2}$;

for $\theta < 0$, if $x_s(p) > z_G(k)/\tan|\theta|$ : $\frac{x_s(p) + z_G(k)\tan\theta}{2} < X < x_s(p)$;

where
$\theta$ = angle of dip for said media,
$x$ = horizontal coordinate of VSP reflection loci,
$x_s$ = source-wellhead offset distance on the surface,
$z_G$ = the depth of the geophone in a borehole,
k = geophones 1, 2, ..., k, and
p = shotpoints 1, 2, ..., p;
   (c) placing said received vertical seismic profile data in said zero source-receiver common reflection point bins determining a normal incidence two-way reflector time for said dipping media to provide boundaries for the time intervals of said zero source receiver common reflection point bins;
   (d) moveout correcting said binned vertical seismic profile data;

(e) stacking said moveout corrected vertical seismic profile data in said zero source-receiver, common reflection point bins; and (f) displaying said moveout corrected, zero source-receiver binned, vertical seismic profile data.

2. The method according to claim 1 wherein the step of determining the bin range of said zero source-receiver, common reflection point bins further comprises the steps of:

determining an inner bin range by selecting the smallest displacement from the borehole which satisfies said bin range criteria; and determining an outer bin range by selecting the greatest displacement from the borehole which satisfies said bin range criteria.

3. A method for binning, moveout correcting and stacking vertical seismic profile data for a dipping media comprising the steps of:

(a) receiving vertical seismic profile data from an acoustic pulse receiver located in a borehole beneath the earth's surface and horizontally offset from any acoustic pulse generator on the surface causing acoustic pulses reflected from said dipping media to be received by said acoustic pulse receiver or receiving vertical seismic profile data from acoustic pulse receivers located on the earth's surface horizontally offset from a borehole containing an acoustic pulse generator causing acoustic pulses reflected by said dipping media to be received by said acoustic pulse receivers located on the earth's surface;

(b) selecting zero source-receiver, common reflection point bins for said received vertical seismic profile data;

(c) determining a normal incidence two-way reflector time for said dipping media to provide boundaries for the time intervals of said zero source receiver common reflection point bins;

(d) moveout correcting said binned vertical seismic profile data;

(e) stacking said moveout corrected vertical seismic profile data in said zero source-receiver, common reflection point bins; and (f) displaying said moveout corrected, zero source-receiver binned, vertical seismic profile data.

4. The method according to claim 3 wherein said normal incidence two-way reflector time for said dipping media is determined according to the following relationship:

$\theta$ = angle of dip for said media, x = horizontal coordinate of VSP reflection loci;

$x_S$ = source-wellhead offset distance on the surface;

$z_G$ = the depth of the geophone in a borehole;

k = geophones 1, 2, ..., k, p = shotpoints 1, 2, ..., p, n = bins 0, 1, ..., p−1, T = primary reflector transit time (transit time for a seismic wave to propagate from the source located on the surface at $x_S$ and to arrive at a geophone at depth $z_G$ as an upcoming wavefield after reflection);

$T_{HS}$ = time required for a wave to propagate from the source to the reflector along a path normal to the reflector;

$T_{HG}$ = time required for a wave to propagate from the source to a hypothetical reflector passing through the geophone with dip (+theta) along a path normal to the reflector;

$T_{HB}$ = time for a wave to propagate from the geophone at depth $z_G$ to the surface along a path normal to the reflector;

$V_{STk}$ = stacking velocity; and $u(p,k) = z_G(k) \tan \theta$.

5. A method for binning, moveout correcting and stacking vertical seismic profile data for a dipping media comprising the steps of:

(a) receiving vertical seismic profile data from an acoustic pulse receiver located in a borehole beneath the earth's surface and horizontally offset from any acoustic pulse generator on the surface causing acoustic pulses reflected from said dipping media to be received by said acoustic pulse receiver or receiving vertical seismic profile data from acoustic pulse receivers located on the earth's surface horizontally offset from a borehole containing an acoustic pulse generator causing acoustic pulses reflected by said dipping media to be received by said acoustic pulse receivers located on the earth's surface;

(b) selecting zero source-receiver, common reflection point bins for said received vertical seismic profile data;

(c) determining a stacking velocity for said formation;

(d) determining the time required for said vertical seismic profile data to propagate from said acoustic pulse receiver to said surface along a path normal to aid dipping reflector;

(e) determining the time required for said vertical $$T(n,p,k) = T_{HS}(n,p,k)\sqrt{1 + \frac{[x_s(p) - z_G(k)\tan\theta]^2}{[2T_{HS}(n,p,k) - T_{HG}(p,k)]^2 v_{STk}^2(T_{HS})}} +$$

$$[T_{HS}(n,p,k) - T_{HG}(p,k)]\sqrt{1 + \frac{[T_{HS}(n,p,k) - T_{HG}(p,k)][x_s(p) - z_G(k)\tan\theta]^2}{[2T_{HS}(n,p,k) - T_{HG}(p,k)]^2[T_{HS}(n,p,k)v_{STk}^2(T_{HS}) - T_{HG}(p,k)v_{STk}^2(T_{HG})]}}$$

where:

$$T_{HS}(n,p,k) = \frac{[t_o(n,p,k) + 2T_{HG}(p,k) - T_{HB}(p,k)] + \sqrt{[t_o(n,p,k) + 2T_{HG}(p,k) - T_{HB}(p,k)]^2 - 4t_o(n,p,k)T_{HG}(p,k)}}{4}$$

$$t_o(n,p,k) = \frac{2[X(n) - x_s(p)][[X(n) - x_s(p)]T_{HB}(p,k) - [X(n) - u(p,k)][2T_{HG}(p,k) - T_{HB}(p,k)]]}{[x_s(p) + u(p,k) - 2X(n)][x_s(p) - u(p,k)]}$$

where:

seismic profile data to propagate from the source to said dipping reflector along a path normal to said dipping reflector;

(f) determining the time required for said vertical seismic profile data to propagate from the source to a hypothetical reflector passing through said acoustic pulse receiver, said hypothetical reflector having the same dip angle as said dipping reflector, along a path normal to the said hypothetical reflector;

(g) determining a two way zero source-receiver travel time;

(h) determining a data set corresponding to said vertical seismic profile and placing said data set in said bins having boundaries determined by said two way zero source-receiver travel time, and (i) moveout correcting said binned vertical seismic profile data;

(j) stacking said moveout corrected vertical seismic profile data in said zero source-receiver, common reflection point bins, and (k) displaying said moveout corrected, zero source-receiver binned, vertical seismic profile data.

6. A method for binning, moveout correcting and stacking for offset vertical seismic profile data for a dipping media acquired by seismic exploration conducted with a deviated borehole comprising the steps of:

(a) receiving vertical seismic profile data from an acoustic pulse receiver located in said deviated borehole beneath the earth's surface and horizontally offset from any acoustic pulse generator on the surface causing acoustic pulses reflected from said dipping media to be received by said acoustic pulse receiver;

(b) selecting zero source-receiver, common reflection point bins for said received vertical seismic profile data according to the following bin range criteria;

for $\theta > 0$, if $x_S(p,k) > z_G(k)\tan\theta : z_G(k)\tan\theta < X <$ $$\frac{x_S(p,k) + z_G(k)\tan\theta}{2}$$

for $\theta > 0$, if $x_S(p,k) < z_G(k)\tan\theta : \frac{x_S(p,k) + z_G(k)\tan\theta}{2} <$ $$X < z_G(k)\tan\theta$$

for $\theta > 0$, if $x_S(p,k) = z_G(k)\tan\theta : X = x_S(p,k)$ for $\theta < 0$, if $x_S(p,k) < z_G(k)/\tan|\theta| : z_G(k)\tan\theta <$ $$X < \frac{x_S(p,k) + z_G(k)\tan\theta}{2}$$

for $\theta < 0$, if $x_S(p,k) >$ $$z_G(k)/\tan|\theta| : \frac{x_S(p,k) + z_G(k)\tan\theta}{2} < X < x_S(p,k)$$

where:
$\theta$ = angle of dip for said media,
$\bar{x}$ = horizontal coordinate of VSP reflection loci,
$\bar{x}_S$ = source-wellhead offset distance on the surface,
$z_G$ = the depth of the geophone in a borehole,
k = geophones 1, 2, ..., k, and
p = shotpoints 1, 2, ..., p;

(c) placing said received vertical seismic profile data in said zero source-receiver common reflection point bins;

(d) moveout correcting said binned vertical seismic profile data;

(d) moveout correcting said binned vertical seismic profile data;

(e) stacking said moveout corrected vertical seismic profile data in said zero source-receiver, common reflection point bins, and (f) displaying said moveout corrected, zero source-receiver binned, vertical seismic profile data.

7. The method according to claim 6 wherein the step of determining the bin range of said zero source-receiver, common reflection point bins further comprises the steps of:

determining an inner bin range by selecting the smallest displacement from the borehole which satisfies said bin range criteria; and determining an outer bin range by selecting the greatest displacement from the borehole which satisfies said bin range criteria.

8. A method for binning, moveout correcting and stacking for offset vertical seismic profile data for a dipping media acquired by seismic exploration conducted with a deviated borehole comprising the steps of:

(a) receiving vertical seismic profile data from an acoustic pulse receiver located in said deviated borehole beneath the earth's surface and horizontally offset from any acoustic pulse generator on the surface causing acoustic pulses reflected from said dipping media to be received by said acoustic pulse receiver;

(b) selecting zero source-receiver, common reflection point bins for said received vertical seismic profile data;

(c) determining a normal incidence two-way reflector time for said dipping media to provide boundaries for the time intervals of said zero source receiver common reflection point bins;

(d) moveout correcting said binned vertical seismic profile data;

(e) stacking said moveout corrected vertical seismic profile data in said zero source-receiver, common reflection point bins; and (f) displaying said moveout corrected, zero source-receiver binned, vertical seismic profile data.

9. The method according to claim 8 wherein said normal incidence two-way reflector time for said dipping media is determined according to the following relationship:

$$T(n,p,k) = T_{HS}(n,p,k)\sqrt{1 + \frac{[x_S(p) - z_G(k)\tan\theta]^2}{[2T_{HS}(n,p,k) - T_{HG}(p,k)]^2 v_{STK}^2(T_{HS})}} +$$

-continued $$[T_{HS}(n,p,k) - T_{HG}(p,k)]\sqrt{1 + \frac{[T_{HS}(n,p,k) - T_{HG}(p,k)][x_s(p) - z_G(k)\tan\theta]^2}{[2T_{HS}(n,p,k) - T_{HG}(p,k)]^2[T_{HS}(n,p,k)v_{STK}^2(T_{HS}) - T_{HG}(p,k)v_{STK}^2(T_{HG})]}}$$

where $$T_{HS}(n,p,k) = \frac{[t_o(n,p,k) + 2T_{HG}(p,k) - T_{HB}(p,k)] + \sqrt{[t_o(n,p,k) + 2T_{HG}(p,k) - T_{HB}(p,k)]^2 - 4t_o(n,p,k)T_{HG}(p,k)}}{4}$$

$$t_o(n,p,k) = \frac{2[X(n) - x_s(p)][[X(n) - x_s(p)]T_{HB}(p,k) - [X(n) - u(p,k)][2T_{HG}(p,k) - T_{HB}(p,k)]]}{[x_s(p) + u(p,k) - 2X(n)][x_s(p) - u(p,k)]},$$

where:
- $\theta$ = angle of dip for said media,
- x = horizontal coordinate of VSP reflection loci;
- $x_s$ = source-wellhead offset distance on the surface;
- $z_G$ = the depth of the geophone in a borehole;
- k = geophones 1, 2, ..., k,
- p = shotpoints 1, 2, ..., p,
- n = bins 0, 1, ..., p-1,
- T = primary reflector transit time (transit time for a seismic wave to propagate from the source located on the surface at $x_s$ and to arrive at a geophone at depth $z_G$ as an upcoming wavefield after reflection);
- $T_{HS}$ = time required for a wave to propagate from the source to the reflector along a path normal to the reflector;
- $T_{HG}$ = time required for a wave to propagate from the source to a hypothetical reflector passing through the geophone with dip (+theta) along a path normal to the reflector;
- $T_{HB}$ = time for a wave to propagate from the geophone at depth $z_G$ to the surface along a path normal to the reflector;
- $V_{STk}$ = stacking velocity; and
- $u(p,k) = z_G(k) \tan\theta$.

10. A method for binning, moveout correcting and stacking for offset vertical seismic profile data for a dipping media acquired by seismic exploration conducted with a deviated borehole comprising the steps of:

(a) receiving vertical seismic profile data from an acoustic pulse receiver located in said deviated borehole beneath the earth's surface and horizontally offset from any acoustic pulse generator on the surface causing acoustic pulses reflected from said dipping media to be received by said acoustic pulse receiver;

(b) selecting zero source-receiver, common reflection point bins for said received vertical seismic profile data;

(c) determining a stacking velocity for said formation;

(d) determining the time required for said vertical seismic profile data to propagate from said acoustic pulse receiver located in said deviated borehole to said surface along a path normal to said dipping reflector;

(e) determining the time required for said vertical seismic profile data to propagate from the source to said dipping reflector along a path normal to said dipping reflector;

(f) determining the time required for said vertical seismic profile data to propagate from the source to a hypothetical reflector passing through said acoustic pulse receiver located in said deviated borehole, said hypothetical reflector having the same dip angle as said dipping reflector, along a path normal to the said hypothetical reflector;

(g) determining a two way zero source-receiver travel time;

(h) determining a data set corresponding to said vertical seismic profile data and placing in said bins having boundaries determined by said two way zero source-receiver travel time;

(i) moveout correcting said binned vertical seismic profile data;

(j) stacking said moveout corrected vertical seismic profile data in said zero source-receiver, common reflection point bins; and (k) displaying said moveout corrected, zero source-receiver binned, vertical seismic profile data.

* * * * *

UNITED STATES PATENT AND TRADEMARK OFFICE
CERTIFICATE OF CORRECTION

PATENT NO. : 4,894,809
DATED : January 16, 1990
INVENTOR(S) : Moeckel

It is certified that error appears in the above-identified patent and that said Letters Patent is hereby corrected as shown below:

Col. 3, line 28, "$D(x_S, 2_G, T)$" should be -- $D(x_S, z_G, T)$ --

Col. 9, line 52, insert -- or -- after "one-way"

Col. 10, line 14, After "stacking." add -- The corresponding stacking traces are also shown in FIG 6. --

Col. 13, line 50, After "semblance" add -- or --

Col. 18, line 5, After "VSP" add -- data --

Col. 21, line 50, "COSO" should be -- $\cos\theta$ and --

Col. 22, line 26, "$z(m) \leq z \leq (m+1)$" should be -- $z(m) \leq z \leq z(m+1)$ --

Col. 25, line 26, Delete one instance of "$-X_G$"

Col. 26, lines 62-63, Delete "reduction and VSP moveout correction are revised as set forth below."

Col. 27, line 31, "meda" should be -- media --

UNITED STATES PATENT AND TRADEMARK OFFICE
CERTIFICATE OF CORRECTION

PATENT NO. : 4,894,809

DATED : January 16, 1990

INVENTOR(S) : Moeckel

It is certified that error appears in the above-identified patent and that said Letters Patent is hereby corrected as shown below:

Col. 28, line 44, "a" should be -- Z --

Col. 30, line 48, "aid" should be -- said --

Col. 31, lines 40 and 42, "if $x_s$" should be --if $\bar{x}_s$--

Col. 31, lines 40-57, All instances of "x" or "X" should be "$\bar{x}$" and "$\bar{X}$" respectively Signed and Sealed this Twenty-fourth Day of September, 1991

*Attest:*

HARRY F. MANBECK, JR.

*Attesting Officer*  *Commissioner of Patents and Trademarks*